US009477128B2

(12) United States Patent
Ruoff et al.

(10) Patent No.: US 9,477,128 B2
(45) Date of Patent: Oct. 25, 2016

(54) GRAPHENE/METAL NANOWIRE HYBRID TRANSPARENT CONDUCTIVE FILMS

(71) Applicant: Board of Regents, The University of Texas System, Austin, TX (US)

(72) Inventors: Rodney S. Ruoff, Austin, TX (US); Iskandar Kholmanov, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 147 days.

(21) Appl. No.: 14/250,019

(22) Filed: Apr. 10, 2014

(65) Prior Publication Data

US 2014/0313562 A1 Oct. 23, 2014

Related U.S. Application Data

(60) Provisional application No. 61/813,776, filed on Apr. 19, 2013.

(51) Int. Cl.
| G02F 1/15 | (2006.01) |
| G02F 1/03 | (2006.01) |
| G09G 3/19 | (2006.01) |
| G09G 3/38 | (2006.01) |
| G02F 1/155 | (2006.01) |

(52) U.S. Cl.
CPC ............ *G02F 1/1506* (2013.01); *G02F 1/155* (2013.01); *G02F 2202/36* (2013.01); *Y10T 428/12056* (2015.01); *Y10T 428/31678* (2015.04)

(58) Field of Classification Search
CPC .. G02F 1/1523; G02F 1/1525; G02F 1/1521; G02F 1/163; G02F 1/1533; G02F 1/03; G02F 1/0316; G02F 3/16; C09K 9/02; B60R 1/088; H04N 9/3167; H04N 9/22

USPC ........ 359/265–275, 277, 245–247, 254, 242; 345/49, 105, 107; 248/817; 438/929
See application file for complete search history.

(56) References Cited

U.S. PATENT DOCUMENTS

| 8,018,563 B2 * | 9/2011 | Jones ..................... B82Y 10/00 252/500 |
| 2014/0037531 A1 | 2/2014 | Liu et al. |

OTHER PUBLICATIONS

Kholmanov et al., "Nanostructured Hybrid Transparent Conductive Films with Antibacterial Properties," ACS Nano, vol. 6, No. 6, Apr. 22, 2012, pp. 5157-5163.

(Continued)

*Primary Examiner* — Dawayne A Pinkney
(74) *Attorney, Agent, or Firm* — Robert A. Voigt, Jr.; Winstead, P.C.

(57) ABSTRACT

A hybrid transparent conductive film, and methods for fabricating such hybrid transparent conductive films, involving the assembly of two-dimensional graphene-based materials with one-dimensional silver and/or copper nanowires with high optical transmittance and good electrical conductivity. The hybrid films are characterized by a good degree of control of the architecture at the nanoscale level, where the weakness(es) of each component are offset by the strengths of the other components. By rational design of the structure and using simple and locate-cost fabrication methods, hybrid films with sheet resistance of 26 ohm/sq and optical transmittance (at λ=550 nm) of 83% for reduced graphene oxide/silver nanowire films, and 64 ohm/sq and optical transmittance of 93.6% for monolayer graphene/silver nanowire films have been fabricated. These values are comparable to transparent conductive films based on indium tin oxide but are now able to be used in flexible electronics due to their good mechanical properties.

10 Claims, 20 Drawing Sheets

(56) References Cited

OTHER PUBLICATIONS

Kholmanov et al., "Reduced Graphene Oxide/Copper Nanowire Hybrid Films as High-Performance Transparent Electrodes," ACS Nano, vol. 7, No. 2, Jan. 29, 2013, pp. 1811-1816.

Kholmanov et al., "Improved Electrical Conductivity of Graphene Films Integrated with Metal Nanowires," Nanno Letters, vol. 12, No. 11, Oct. 26, 2012, pp. 5679-5683.

* cited by examiner

| TCFs | Conc. Ag NW solution | $T_{550}$, % | $R_S$, Ω/sq |
|---|---|---|---|
| SINGLE COMPONENT FILMS | | | |
| Ag NW | 1.0 mg/ml | 96 | - |
| Ag NW | 2.0 mg/ml | 90 | 740 ± 29.6 |
| Ag NW | 2.5 mg/ml | 88 | 520 ± 15.6 |
| RG-O | - | 94 | 49.2 ± 1.96 k |
| RG-O/Au NP | - | 93 | 28.6 ± 1.43 k |
| HYBRID FILMS | | | |
| RG-O/Au NP/Ag NW | 1.0 mg/ml | 91 | 1460 ± 58.4 |
| RG-O/Au NP/Ag NW | 2.0 mg/ml | 85 | 86 ± 3.4 |
| RG-O/Au NP/Ag NW | 2.5 mg/ml | 83 | 26 ± 1.04 |

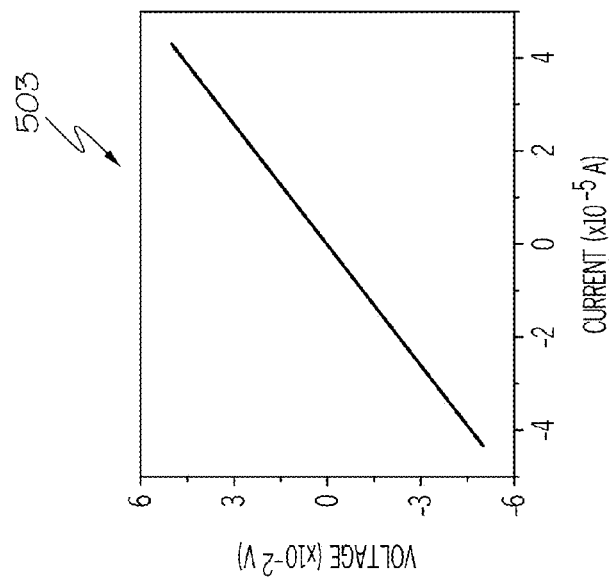
FIG. 5B
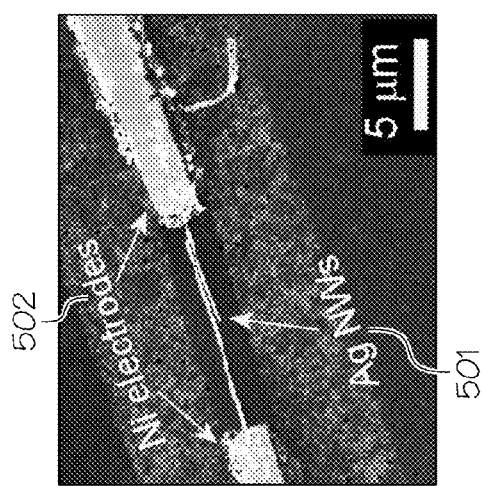
FIG. 5A(1)
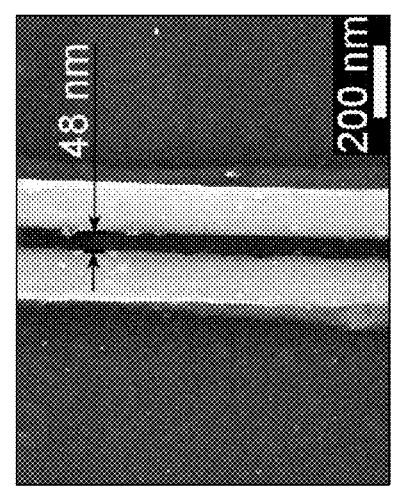
FIG. 5A(2)

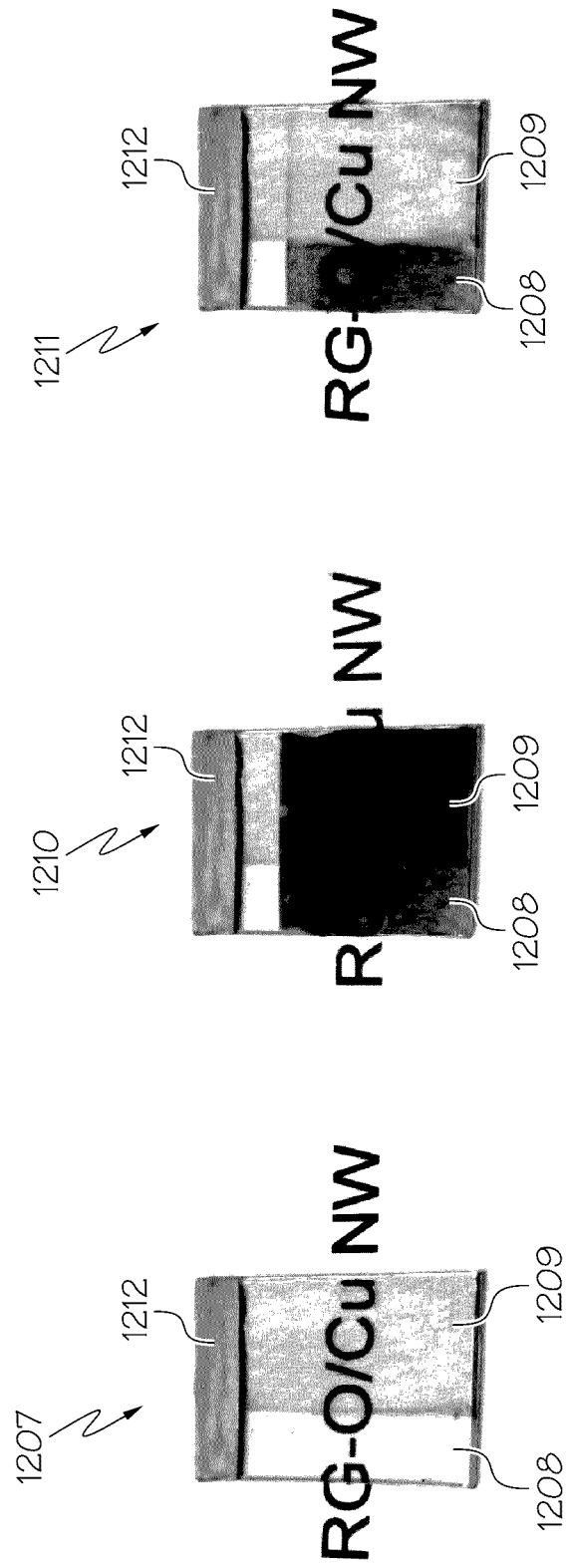

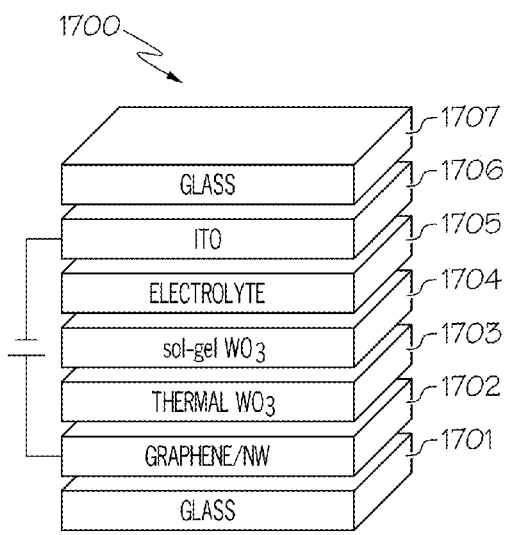
FIG. 17A
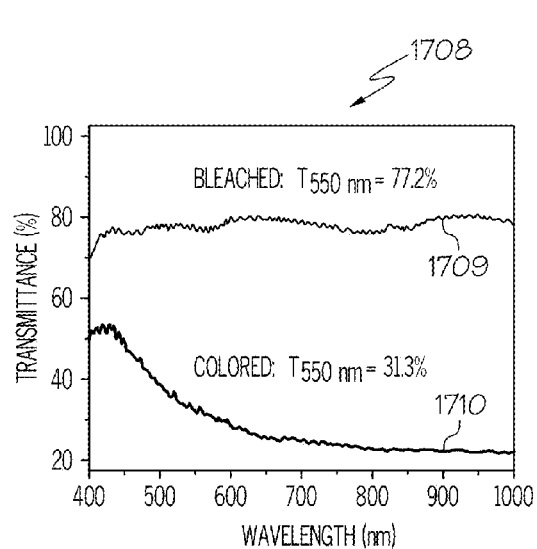
FIG. 17B
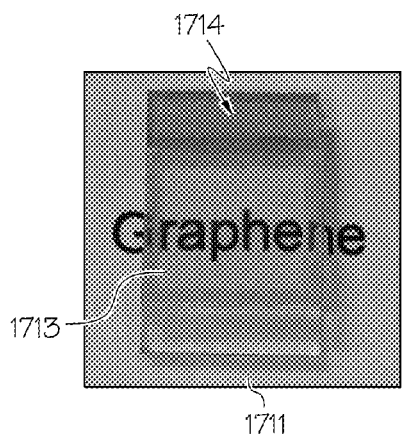
FIG. 17C(1)
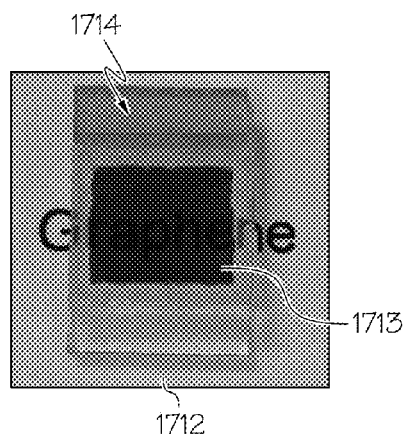
FIG. 17C(2)

… (US 9,477,128 B2, col. 1–2)

GRAPHENE/METAL NANOWIRE HYBRID TRANSPARENT CONDUCTIVE FILMS

CROSS REFERENCE TO RELATED APPLICATIONS

This application is related to the following commonly owned co-pending U.S. Patent Application:

Provisional Application Ser. No. 61/813,776, "Graphene/Metal Nanowire Hybrid Transparent Conductive Films," filed Apr. 19, 2013, and claims the benefit of its earlier filing date under 35 U.S.C. §119(e).

TECHNICAL FIELD

The present invention relates generally to transparent conductive films, and more particularly to graphene/metal nanowire hybrid transparent conductive films.

BACKGROUND

Transparent conducting films (TCFs) are optically transparent and electrically conductive in thin layers. TCFs are widely used in many applications, such as being used in displays, solar cells, transistors, sensors and energy storage systems. New devices and emerging technologies are setting additional criteria for TCFs: in addition to good optical transmittance and electrical conductivity, it is desirable to have high chemical and thermal stability, compatibility with other functional components of devices, ease of integration in flexible electronics and being low-cost.

Currently, indium tin oxide (ITO) is the main material being used for TCFs applications. While ITO exhibits excellent electrical conductivity and high optical transmittance, ITO has a brittle structure as well as has poor compatibility with organic materials. Furthermore, the cost of ITO has been increasing due to the increasing cost of indium. As a result, ITO cannot satisfy all the requirements of the emerging device applications, such as having high chemical and thermal stability, compatibility with other functional components of devices, ease of integration in flexible electronics and being low-cost.

As a result, alternatives to ITO are required that can meet the requirements of these emerging device applications.

BRIEF SUMMARY

In one embodiment of the present invention, a method for fabricating a hybrid transparent conductive film comprises spin coating silver nanowires onto glass slides. The method further comprises covering the silver nanowires with a graphene oxide/gold nanoparticle film. Furthermore, the method comprises exposing the graphene oxide/gold nanoparticle/silver nanowire film to hydrazine vapor thereby forming a reduced graphene oxide/gold nanoparticle/silver nanowire hybrid transparent conductive film.

In another embodiment of the present invention, a hybrid transparent conductive film comprises a film of silver nanowires. The hybrid transparent conductive film further comprises a film of a combination of reduced graphene oxide films and gold nanoparticles covering the film of silver nanowires.

In a further embodiment of the present invention, a method for fabricating hybrid transparent conductive films comprises spin coating a reduced graphene oxide film onto a first glass substrate. The method further comprises spray coating a copper nanowire film onto a second glass substrate. Furthermore, the method comprises spin coating a Poly(methyl methacrylate) (PMMA) layer on top of the reduced graphene oxide film. Additionally, the method comprises transferring the PMMA layer/reduced graphene oxide film onto the copper nanowire film. In addition, the method comprises removing the PMMA layer thereby resulting in a reduced graphene oxide/copper nanowire hybrid transparent conductive film.

In another embodiment of the present invention, a hybrid transparent conductive film comprises copper nanowire films and reduced graphene oxide platelets on top of the copper nanowire films.

In yet another embodiment of the present invention, a method for fabricating hybrid transparent conductive films comprises spin coating a silver nanowire film onto a glass substrate. The method further comprises depositing a Poly (methyl methacrylate) (PMMA) layer onto a layer of graphene. Furthermore, the method comprises transferring the PMMA/graphene layer onto the silver nanowire film. Additionally, the method comprises drop coating a PMMA solution on top of the PMMA/graphene/silver nanowire film. In addition, the method comprises removing the coating of the PMMA solution and the PMMA layer following the drop coating of the PMMA solution thereby resulting in a graphene/silver nanowire hybrid transparent conductive film.

In another embodiment of the present invention, an electrochromic device comprises a first layer of a glass substrate. The electrochromic device further comprises a graphene/silver nanowire film residing on top of the first layer of the glass substrate. Furthermore, the method comprises a buffer layer of tungsten trioxide film on top of the graphene/silver nanowire film. Additionally, the method comprises a layer of sol-gel tungsten trioxide film residing on top of the buffer layer of tungsten trioxide film. In addition, the method comprises an electrolyte residing on the layer of sol-gel tungsten trioxide film. The method further comprises an indium tin oxide layer residing on the electrolyte. The method additionally comprises a second layer of a glass substrate residing on the indium tin oxide layer.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIGS. 5A(1)-5A(2) illustrate SEM images of two parallel NWs, individually contacted with Ni electrodes and covered with a RG-O/Au NP film, used to measure the resistance of the system in accordance with an embodiment of the present invention;

FIG. 5B is a graph of the linear I-V characteristics of the system indicating the formation of ohmic contacts between parallel NWs and the RG-O film;

FIGS. 12C(1)-12C(3) illustrate the as-prepared mixed transparent electrode composed of pure Cu NW films and RG-O/Cu NW films with a silver (Ag) paste on top of the electrode in accordance with an embodiment of the present invention;

FIG. 17A is a schematic illustration of an electrochromic device structure in accordance with an embodiment of the present invention;

FIG. 17B is a graph depicting the optical transmittance spectra of bleached and colored states of the electrochromic device of FIG. 17A in accordance with an embodiment of the present invention; and FIGS. 17C(1)-17C(2) depict photograph images showing homogeneously bleached and colored states of the electrochromic device of FIG. 17A with a graphene/Ag NW transparent electrode in accordance with an embodiment of the present invention.

DETAILED DESCRIPTION

Figure 1A:
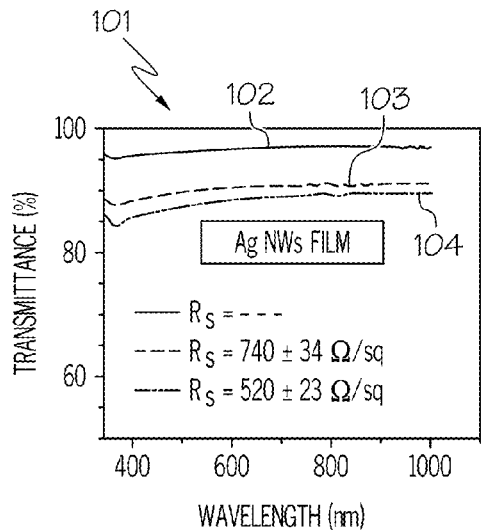
FIG. 1A shows a graph of the transparent conductive film (TCF) characteristics (percentage of transmittance versus wavelength) of Ag nanowire (NW) films obtained by spin coating of NW dispersions in isopropyl alcohol with three different concentrations: 1.0, 2.0, and 2.5 mg/mL on glass substrates in accordance with an embodiment of the present invention.

Today, indium tin oxide (ITO) is the main material used for transparent conductive films (TCFs). However, the brittle ceramic structure, poor compatibility with organic materials and the growing cost of indium seriously limit the use of ITO in TCFs, especially in emerging flexible electronics and large-area applications. Therefore, several other materials including new oxide films, conductive polymers, carbon nanotubes (CNTs), metal nanostructures and graphene-based nanostructures have been investigated as alternatives to ITO. Among these materials, one-dimensional (1D) CNTs and metal nanowires (NWs) and 2D graphene-based films are particularly interesting due to their good TCF characteristics, such as low sheet resistance (Rs) and high optical transmittance (T), which are comparable to/or better than that of ITO films. However, their use in a wide range of TCF-using devices is restricted by several specific drawbacks. Metal NW and CNT films are characterized by open spaces between nanostructures, high surface roughness, and poor adhesion to substrates. In addition, the high reactivity of metal NW films may cause oxidation that can limit their long-term applications. In contrast, 2D graphene films grown by chemical vapor deposition (CVD) of hydrocarbon gases are characterized by continuous film morphology and excellent TCF characteristics (Rs=30 Ω/sq with optical transmittance of 90% at 550 nm wavelength ($T_{550}$)). Drawbacks of graphene films include the currently costly fabrication procedures that use vacuum and high temperature and the time-consuming and challenging multiple transfer steps from metal to the transparent substrate. Moreover, the growth of functional films with controlled morphology on graphene might be challenging due to the low density of nucleation sites on CVD-grown graphene, and, therefore, may require further treatments. These disadvantages are absent in reduced graphene oxide (RG-O) films, which are another candidate for TCF applications. RG-O films are obtained by simple solution processing, allowing direct deposition on any substrate. The main drawback of RG-O films is the relatively high Rs (>1 kΩ/sq at $T_{550}$>85%).

These shortcomings of single-component TCFs might be overcome by hybrid films, in which the film properties can be improved due to synergy between individual components. Recent theoretical studies of graphene/metal NW TCFs demonstrate a promising approach to decrease the sheet resistance of graphene using metal NWs. Moreover, hybrid TCFs may exhibit additional functionalities that can vary depending on their composition. This feature opens up possibilities for developing next generation multicomponent and multifunctional TCFs.

The principles of the present invention present herein a general strategy for assembling TCFs composed of zero-dimensional (0D) Au nanoparticles (NPs), 1D Ag nanowires (NWs), and 2D RG-O platelets. The decreased sheet resistance of the hybrid films, compared to the single-component films, has been demonstrated both macroscopically by measuring the sheet resistance of 1×1 $cm^2$ area films and microscopically by measuring the resistance between two parallel noncontacting Ag NWs bridged by RG-O coverage. Performance of other thin film characteristics and additional functionality of the hybrid films have been shown to demonstrate the advantage of the hybrid films.

Results and Discussion

Among RG-O platelets, Au NPs, and Ag NWs, the Ag NWs and RG-O platelets can form single-component TCFs. FIG. 1A shows a graph 101 of the TCF characteristics (percentage of transmittance versus wavelength) of Ag NW films obtained by spin coating of NW dispersions in isopropyl alcohol with three different concentrations: 1.0, 2.0, and 2.5 mg/mL (line 102 represents the TCF characteristics of Ag NW films obtained by spin coating of NW dispersions in isopropyl alcohol with a concentration of 1.0 mg/mL; line 103 represents the TCF characteristics of Ag NW films obtained by spin coating of NW dispersions in isopropyl alcohol with a concentration of 2.0 mg/mL; line 104 represents the TCF characteristics of Ag NW films obtained by spin coating of NW dispersions in isopropyl alcohol with a concentration of 2.5 mg/mL) on glass substrates in accordance with an embodiment of the present invention. The average length and diameter of the NWs are in the range of 20-40 μm and 100-130 nm, respectively. High optical transparency of the Ag NW TCFs is provided by the open spaces between nanowires and decreases with increasing NW concentration in the film. The Ag NW films, obtained using the 1.0 mg/mL dispersion, are nonconductive because of subpercolation networks of NWs and possess $T_{550}$=96% (FIG. 1A). Electrical conductivity of the films, obtained using 2.0 and 2.5 mg/mL dispersions, is provided through the percolation network between nanowires, resulting in Rs of 740+/−34 and 520+/−23 Ω/sq for $T_{550}$ of 90 and 88%, respectively (FIG. 1A).

The main contribution to the overall resistance of the NW films might be expected to be from the junctions formed by crossing NWs. In the films of the present invention, the measured NW-NW junction resistances (61 and 67 Ω) are very close to the resistance of individual NWs (61 and 77 Ω), demonstrating good contact between crossed Ag NWs as shown in FIG. 1B.

Figure 1B:
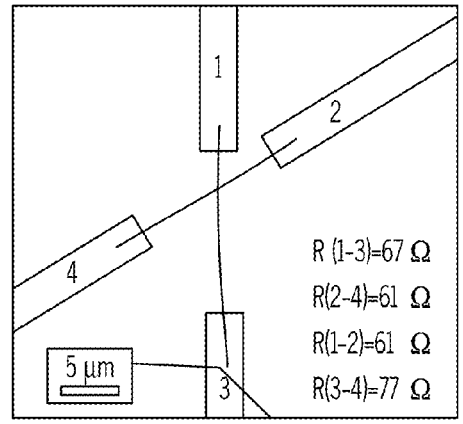
FIG. 1B is an SEM image of a NW-NW junction with four Ni electrodes used to measure the resistance of individual NWs and the junction resistance between NWs in accordance with an embodiment of the present invention.

FIG. 1B is an SEM image of a NW-NW junction with four Ni electrodes used to measure the resistance of individual NWs and the junction resistance between NWs in accordance with an embodiment of the present invention.

Figure 1C:
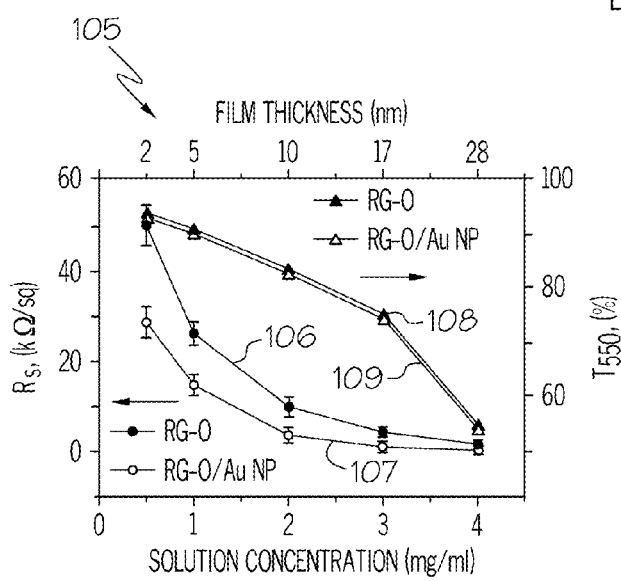
FIG. 1C is a graph showing the Rs and T of RG-O and RG-O/Au NP films obtained by spin coating of the G-O and G-O/Au NP dispersions with different concentrations and then exposing the films to hydrazine vapor at 100° C. in accordance with an embodiment of the present invention.

In contrast to the Ag NW films, RG-O films are continuous and smooth. A typical RG-O film with Rs=49.2+/−4.47 kΩ/sq possesses $T_{550}$≈94% as shown in FIG. 1C. FIG. 1C is a graph 105 showing the Rs and T of RG-O and RG-O/Au NP films (Rs of RG-O represented by line 106; Rs of RG-O/Au NP represented by line 107; T of RG-O represented by line 108; Rs of RG-O/Au NP represented by line 109) obtained by spin coating of the G-O and G-O/Au NP dispersions with different concentrations and then exposing the films to hydrazine vapor at 100° C. in accordance with an embodiment of the present invention. Such high Rs values can be ascribed to the presence of defects introduced during the synthesis and processing of G-O and interlayer resistance between the RG-O platelets. In an attempt to minimize and/or eliminate the role of the two factors, Au NPs and Ag NWs are combined with RG-O platelets to create hybrid films. The concept of the present invention is based on a strategy in which each component improves the hybrid film by addressing the weaknesses of the other components.

Adding Au NPs significantly decreases the resistance of the RG-O platelets as shown in FIG. 1C, likely due to the NPs decorating defect sites. Rs values of RG-O/Au NP films (28.6+/−1.43 kΩ/sq), obtained using a 0.5 mg/mL G-O dispersion, were significantly lower than that for the corresponding RG-O films (49.2+/−4.47 kΩ/sq). The Au NPs do not influence the T values of the RG-O/Au NP films as shown in FIG. 1C, probably because of their low concentration and small size.

Figure 2:
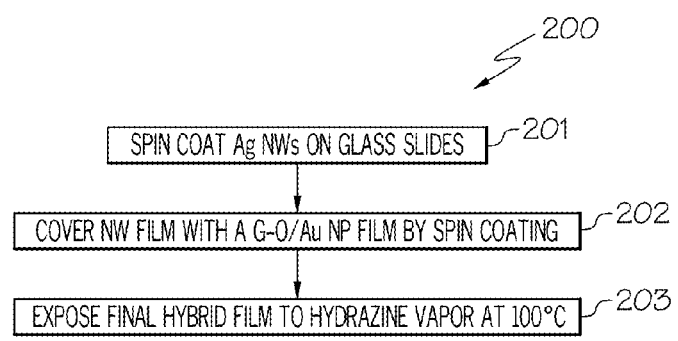
FIG. 2 is a flowchart of a method for fabricating a hybrid transparent conductive film in accordance with an embodiment of the present invention.

Ag NWs were added with the goal of minimizing and/or eliminating the junction resistance between RG-O platelets. FIG. 2 is a flowchart of a method 200 for fabricating a hybrid transparent conductive film in accordance with an embodiment of the present invention. In particular, method 200 is a process for fabricating the hybrid RG-O/Au NP/Ag NW TCFs, composed of a film of Ag NWs covered by a RG-O/Au NP film. FIG. 2 will be discussed in conjunction with FIGS. 3A-3C, which depict schematic views of the hybrid film formed using the steps described in method 200 of FIG. 2 in accordance with an embodiment of the present invention.

Figures 3A, 3B:
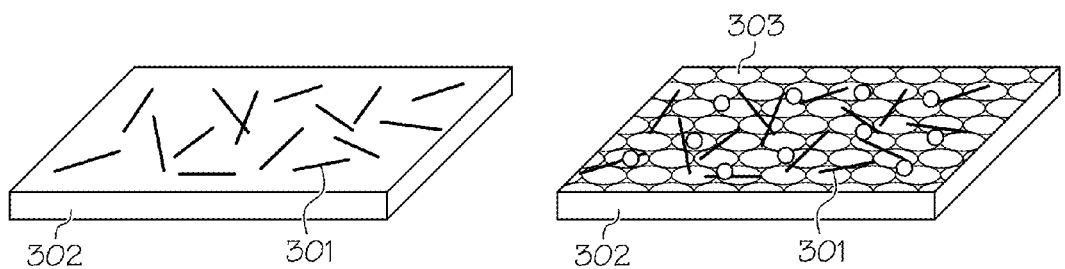
FIGS. 3A-3C depict schematic views of the hybrid transparent conductive film formed using the steps described in the method of FIG. 2 in accordance with an embodiment of the present invention.
Figure 3C:
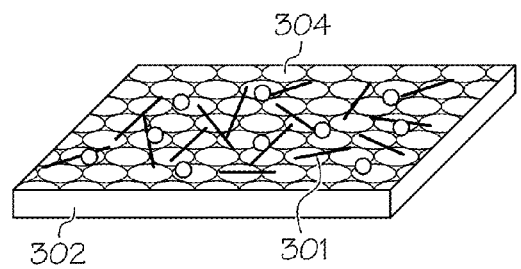

Referring to FIG. 2, in conjunction with FIGS. 3A-3C, in step 201, AG NWs 301 are spin coated on glass slides 302 as shown in FIG. 3A.

In step 202, the resulting Ag NW film 301 is covered with a G-O/Au NP (0.5 mg/mL) film 303 by spin coating as shown in FIG. 3B.

In step 203, the hybrid film (G-O/Au NP/Ag NW) is exposed to hydrazine vapor at 100° C. for 24 h resulting in the structure (RG-O/Au NP/Ag NW) 304 shown in FIG. 3C.

In some implementations, method 200 may include other and/or additional steps that, for clarity, are not depicted. Additionally, in some implementations, certain steps in method 200 may be omitted.

Figures 3D, 3E:
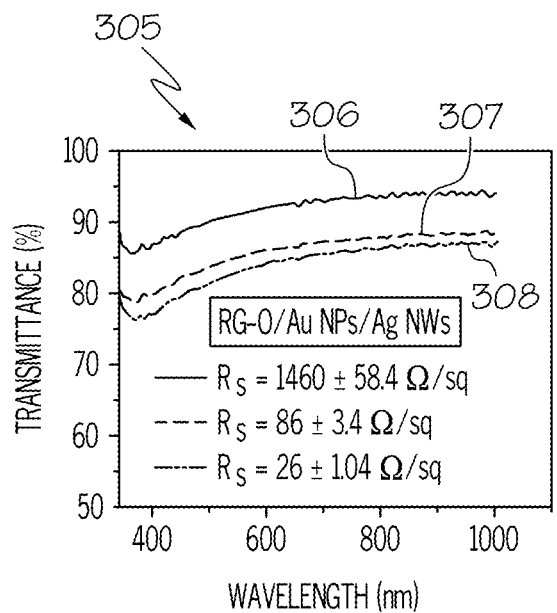
FIG. 3D is a graph illustrating the optical transmittance spectra and Rs of the hybrid films obtained using the method of FIG. 2 using three different concentrations of the Ag NW dispersions: 1.0 mg/mL; 2.0 mg/mL; and 2.5 mg/mL in accordance with an embodiment of the present invention.
FIG. 3E is a table showing the Rs and $T_{550}$ data for single-component and hybrid films in accordance with an embodiment of the present invention.

Hybrid films with Rs=26+/−1.04 Ω/sq at $T_{550}$=83% as shown in FIG. 3D, comparable to ITO (Rs≈30 Ω/sq at $T_{550}$≈90%), were obtained. FIG. 3D is a graph 305 illustrating the optical transmittance spectra and Rs of the hybrid films obtained using method 200 using three different concentrations of the Ag NW dispersions: 1.0 mg/mL (shown in line 306); 2.0 mg/mL (shown in line 307); and 2.5 mg/mL (shown in line 308) in accordance with an embodiment of the present invention. By using the architecture of the present invention, conductive hybrid films were obtained that even have a subpercolation (nonconductive) Ag NW film, demonstrating the synergy of the various components as shown in FIG. 3E. FIG. 3E is a table showing the Rs and $T_{550}$ data for single-component and hybrid films in accordance with an embodiment of the present invention.

Figure 4A:
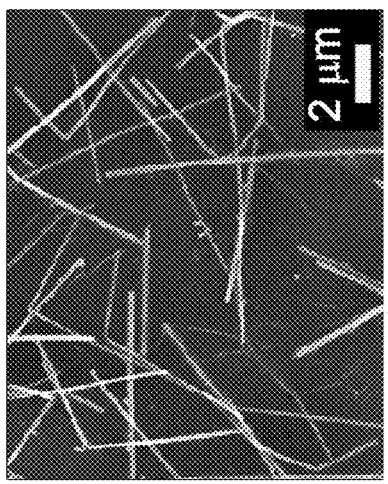
FIG. 4A is an SEM image showing the hybrid films composed of randomly oriented Ag NWs covered by the RG-O/Au NPs film in accordance with an embodiment of the present invention.
Figure 4B:
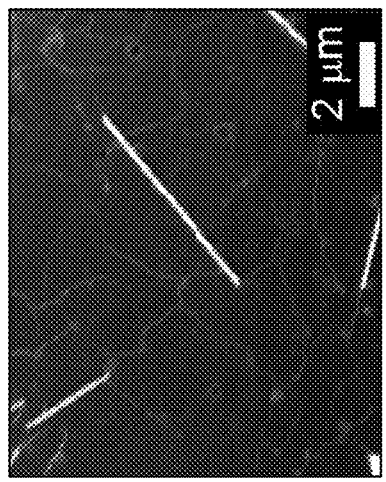
FIG. 4B is an SEM image showing that Ag NWs possessing the highest electrical conductivity among the single components can connect two or more RG-O platelets thereby decreasing the interplatelet resistance in accordance with an embodiment of the present invention.
Figure 4C:
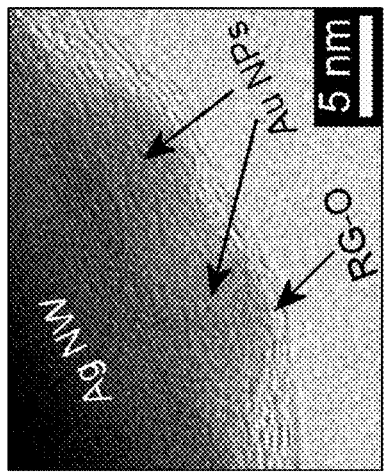
FIGS. 4C-4D are SEM images showing that Au NPs can be located either between RG-O and Ag NWs where all three components tightly contact each other or trapped on RG-O platelets serving as a bridge between NWs, respectively, in accordance with an embodiment of the present invention.
Figure 4D:
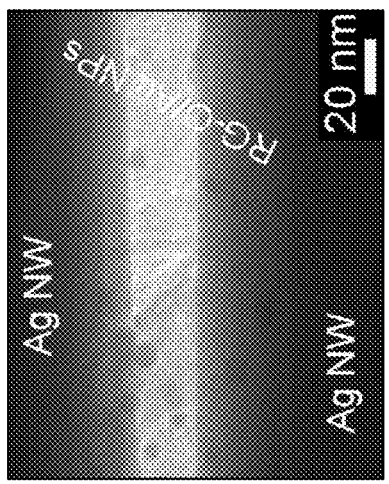
Figure 4E:
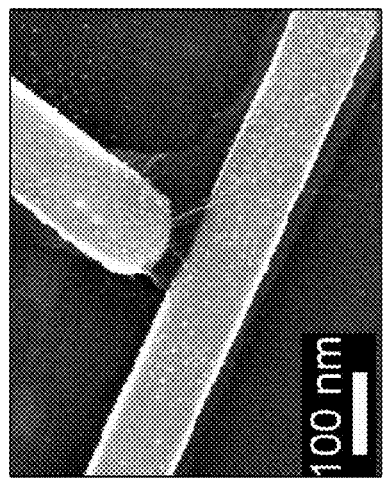
FIG. 4E is an SEM image illustrating that the RG-O platelets cover almost half of the surface of a typical Ag NW by following its curvature thereby providing a high contact area between RG-O and NWs that enhances charge transfer between these two nanostructures and improves conductivity in accordance with an embodiment of the present invention.
Figure 4F:
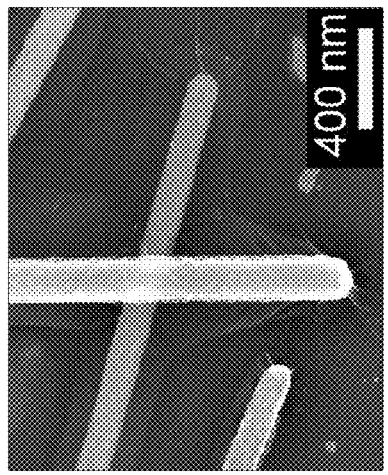
FIG. 4F is an SEM image illustrating that a certain number of NWs do not directly contact the substrate because they lay across the top of other NWs that directly contact the substrate in accordance with an embodiment of the present invention.

Structural analysis of the hybrid films suggests some details of the role of each component in improving the performance of the hybrid films as shown in FIGS. 4A-4F. FIG. 4A is an SEM image showing the hybrid films composed of randomly oriented Ag NWs covered by the RG-O/Au NPs film in accordance with an embodiment of the present invention. FIG. 4B is an SEM image showing that Ag NWs possessing the highest electrical conductivity among the single components can connect two or more RG-O platelets thereby decreasing the interplatelet resistance in accordance with an embodiment of the present invention. FIGS. 4C-4D are SEM images showing that Au NPs can be located either between RG-O and Ag NWs where all three components tightly contact each other or trapped on RG-O platelets serving as a bridge between NWs, respectively, in accordance with an embodiment of the present invention. FIGS. 4E and 4F are SEM images indicating some important features of the 2D RG-O platelets that can contribute to the performance of the hybrid films. Particularly, RG-O platelets cover almost half of the surface of a typical Ag NW by following its curvature thereby providing a high contact area between RG-O and NWs that enhances charge transfer between these two nanostructures and improves conductivity as shown in FIG. 4E in accordance with an embodiment of the present invention. In addition, a certain number of NWs do not directly contact the substrate because they lay across the top of other NWs that directly contact the substrate as shown in FIG. 4F in accordance with an embodiment of the present invention. The RG-O/Au NP film covers the entire surface, including all NWs and open spaces between NWs. The latter is particularly important, for instance, for applications in photovoltaic devices since the charge diffusion distance in hybrid films is smaller compared with the spacing between NWs.

The RG-O platelets can reduce the Rs of the NW film by bridging noncontacting NWs. This is particularly pronounced between nearby NWs. FIGS. 5A(1)-5A(2) illustrate SEM images of two parallel NWs 501, individually contacted with Ni electrodes 502 and covered with a RG-O/Au NP film, used to measure the resistance of the system in accordance with an embodiment of the present invention. The inset shows a higher magnification image showing the distance of 48 nm between the parallel Ag NWs. Without the RG-O/Au NP film, the system was not conducting. Once the RG-O/Au NP film was added, the NWs became connected with a resistance of 1.16 k$\Omega$, showing that the RG-O/Au NP film acts as a 2D bridge between NWs to provide good electrical conductivity. The linear I-V characteristic of the system indicates the formation of ohmic contacts between parallel NWs and RG-O film as shown in FIG. 5B (graph 503 of the linear I-V characteristic of the system) in accordance with an embodiment of the present invention.

It should be noted that, on one hand, Rs values of our pure Ag NWs films are higher compared to those in the recently reported papers. On the other hand, the junction resistance between crossed NWs is much lower than reported by others. Such differences are likely due to the difference in precursor materials and/or experimental conditions used to produce the NW films. The importance of these results is that by using 2D RG-O platelets, the sheet resistance of 1D NW films can be further decreased, as shown both by macroscopic measurements of the Rs values (FIG. 3C) and by microscopic studies of two parallel NWs covered with RG-O platelets (FIGS. 5A(1)-5A(2)). Thus, using the approach of the present invention for Ag NW TCFs with better TCF characteristics, one can obtain higher performance hybrid TCFs.

Although all of the films presented herein were on rigid inflexible substrates, one might expect similar results for flexible substrates because (i) all thin film fabrication and processing have been performed at temperatures compatible with processing of flexible substrates, and (ii) single-component TCFs of RG-O and of Ag NWs on flexible substrates have already been demonstrated.

Thus, the assembly of these 0D, 1D, and 2D nanostructures allows one to obtain hybrid films, where the weaknesses of each component are offset by the strengths of the other components. The overall composition and architecture (RG-O/Au NPs on top of NWs) not only results in higher conductivity but also provides better performance. In particular, the RG-O film might act as a protective layer for the metal NWs underneath from possible oxidation or corrosion processes and may provide a more continuous network.

Another distinguishable feature of hybrid TCFs might be their multifunctionality arising due to either the individual functionality of each single component or integrative synergy between single constituents. Such additional functionality of the hybrid films may be their bactericidal activity since both silver nanostructures and recently RG-O platelets have been shown to be toxic to diverse bacteria. Taking this fact into account, the antibacterial properties of the RG-O/Au NP/Ag NW hybrid films were investigated against *Escherichia coli* bacteria by carrying out two types of experiments. In the first experiment, the ability of bacteria to attach to hybrid films in solution in adhesion experiments was investigated. The growth of bacterial colonies from solutions sprayed on the hybrid film surfaces in viability experiments was then studied.

Figure 6A:
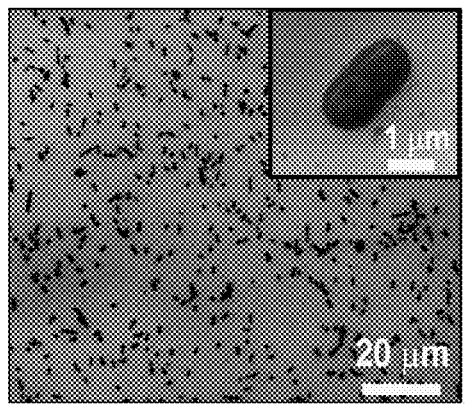
FIG. 6A is an SEM image of a clean Si wafer, after being removed from the bacterial solution and washed with distilled water, which shows a large number of E. coli bacteria attached to its surface in accordance with an embodiment of the present invention.
Figure 6B:
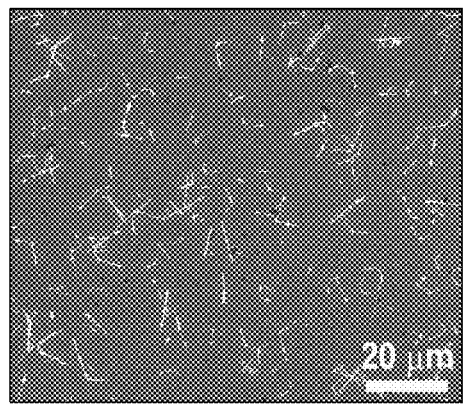
FIG. 6B is an SEM image of a Si waver covered with a RG-O/Au NP/Ag NW hybrid film after the adhesion experiments in accordance with an embodiment of the present invention.

In the adhesion experiments, two Si wafers, one coated with the hybrid film and one without, were submerged in separate, but identical, bacterial solutions and incubated overnight. The samples were then removed from the bacterial solution and delicately washed with distilled water to remove excess bacterial solution. FIG. 6A is a typical SEM image of a clean Si wafer after this treatment which shows a large number of *E. coli* bacteria attached to its surface in accordance with an embodiment of the present invention. The size of a typical bacterium attached to the wafer is about 2 µm in length and 1 µm in width, as shown in the SEM image in the FIG. 6A inset. In contrast to the clean Si wafers, on the hybrid film-covered Si wafers, after this treatment, one can observe a few black objects with sizes ranging from tens to hundreds of nanometers as shown in FIG. 6B, which is an SEM image of a Si waver covered with a RG-O/Au NP/Ag NW hybrid film (white streaks are the Ag NWs obtained using a 1.0 mg/mL AgNW dispersion) after the adhesion experiments in accordance with an embodiment of the present invention. These objects are significantly smaller than intact *E. coli* bacterium size (FIG. 6A inset). It is suggested that these objects are the remains of *E. coli* disrupted by interacting with the hybrid film. In contact with the RG-O platelets, the outer membrane of the bacteria can be damaged resulting in a loss of cellular integrity. Therefore, the observed results, where no intact bacteria adhere to the hybrid films (FIG. 6B), can likely be ascribed to these bactericidal properties.

It is worth noting that after this experiment, the TCF characteristics of the hybrid films can be easily recovered by annealing the films at 100° C. for 30 min under ambient atmosphere. In contrast, pure AgNW films left overnight in the bacterial solution irreversibly lost their TCF characteristics because most of the Ag NWs were detached from the substrate. These results demonstrate an essential advantage of the hybrid TCFs over pure Ag NW TCFs and show that the presence of the top RG-O coverage promotes adhesion of all components of the hybrid films to the substrate, even in liquid solutions. In this context, pure Ag NW TCFs have serious limitations in use in solution-based treatment and growth processes and cannot be applied, for instance, in widely used solution-based electrochemical growth of functional films on top of TCFs.

Figure 6C:
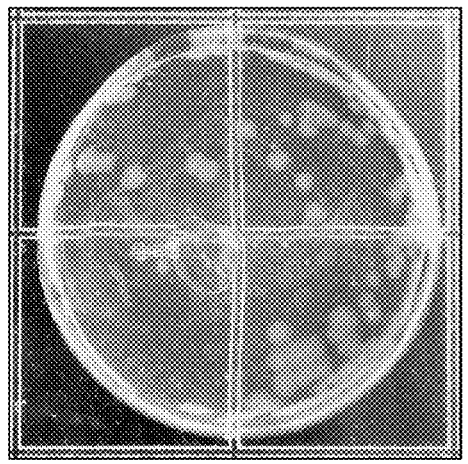
FIG. 6C is a photograph of the clean glass slide where the white dots represent the formed bacterial colonies grown during incubation in accordance with an embodiment of the present invention.
Figure 6D:
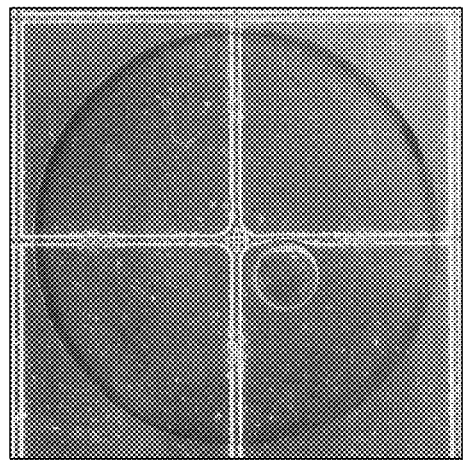
FIG. 6D is a photograph of the glass slide covered with RG-O/Au NP/Ag NW hybrid films after the viability experiments in accordance with an embodiment of the present invention.

In the viability experiments, an overnight culture of *E. coli* bacteria solution was sprayed onto the surface of two glass slides, one with and one without the hybrid film. After drying for about 3 min, both slides were covered with an agar solution and incubated overnight. Bacteria sprayed on the clean glass slide formed bacterial colonies as shown in FIG. 6C, where FIG. 6C is a photograph of the clean glass slide where the white dots represent the formed bacterial colonies grown during incubation in accordance with an embodiment of the present invention. An average of 34 colonies/slide (averaged over 11 tested samples) was observed. No bacterial colonies were observed on the hybrid film-covered glass slides as shown in FIG. 6D, where FIG. 6D is a photograph of the glass slide covered with RG-O/Au NP/Ag NW hybrid films after the viability experiments in accordance with an embodiment of the present invention. These results show that the spray-deposited bacteria on top of the hybrid films were completely inactivated, indicating the toxicity of the hybrid films to *E. coli* bacteria.

The antibacterial properties of the hybrid films demonstrated in these two different types of experiments can be ascribed mainly to the RG-O since it is the top layer and in direct contact with the bacteria. Indeed, pure RG-O films with no NWs provided similar antibacterial results. The mechanism of the microbial activity of the RG-O films can be described by taking into account both membrane and oxidative stresses. The membrane stress is caused by direct contact of the bacteria with sharp edges of the RG-O platelets disrupting the outer membrane of the cells and causing subsequent oxidative stresses. In addition, it was reported that antibacterial activity of conductive RG-O differs from that of electrically insulating G-O platelets, and this can be ascribed to the difference in charge transfer processes in bacteria/RG-O and bacteria/G-O systems. In this context, combination of the TCF characteristics with the antibacterial properties may allow producing hybrid TCFs with controlled bioactivity. In particular, charge transfer processes between the bacteria and RG-O in the hybrid TCFs can be tuned by applying external electrical and/or optical fields.

Thus, assembly of the antibacterial RG-O platelets with highly conductive Ag NW films yields hybrid TCFs with improved electrical conductivity and bactericidal properties. Antibacterial hybrid TCFs with integrated functionalities can be used as bactericidal and transparent electromagnetic interference (EMI) shielding coatings. This application might be attractive, for instance, for displays and windows of diverse medical electronics, such as medical computers and magnetic resonant imaging windows, and also for personal electronics, such as cell phones, media players, and computers for which healthcare issue is of importance. This application aspect is strengthened by the fact that silver and carbon nanostructures including transparent conductive CNT films possess highly effective EMI shielding characteristics. In these applications, the antibacterial hybrid TCFs provide electrically conductive, optically transparent, and medically clean sterile environments.

Thus, the approach of the present invention demonstrates that covering the highly conductive metal NW-based TCFs with 2D Au-decorated RG-O platelets has vital practical importance to yield better TCF characteristics due to the synergy between the nanostructures used, with the additional benefit of providing antibacterial activity. Two-dimensional RG-O platelets can act as a protective and adhesive layer, conductive bridge to the nondirectly contacting metal NWs, and also provide a more continuous network, which is important for applications in photovoltaic devices since the charge diffusion distance is smaller compared with the spacing between NWs. The presented strategy based on the use of 0D, 1D, and 2D nanostructures offers exciting possibilities for generating multifunctional TCFs with novel architectures. For example, the Au NPs could be replaced by semiconductor quantum dots, or plasmonic or catalytic NPs, and the Ag NWs could be replaced by other 1D nanostructures with different optical, magnetic, electronic and catalytic responses. Such hybrid TCFs might improve the performance of existing and emerging devices.

Methods

Synthesis of Nanostructures Used to Fabricate Hybrid Films.

Graphite oxide was produced from natural graphite (SP-1, Bay Carbon, Mich.) using a modified version of the Hummers method, as detailed previously. Aqueous dispersions of individual graphene oxide (G-O) platelets of the various concentrations were prepared by stirring graphite oxide solids in pure water (17.5 MΩ, Barnstead) for 3 h, and then sonicating the mixture (VWR B2500A-MT, a bath sonicator) for 45 min.

Aqueous solutions of Au NPs were prepared through the addition of 0.01 g of sodium borohydride ($NaBH_4$) to 100 mL of an aqueous solution ($10^{-4}$ M) of tetrachloroauric acid ($HAuCl_4$) at room temperature, as detailed elsewhere. The G-O/Au NP dispersions were formed by combining freshly prepared Au NP solutions with G-O dispersions of various concentrations in 1:1 volume ratios.

Ag NWs with average length of 20-40 μm and average diameter of 100-130 nm dispersed in isopropyl alcohol (20 mg/mL) were purchased from SeaShell Technology. The initial solution was diluted with isopropyl alcohol (99.9%, Fisher Scientific) in order to obtain 1.0, 2.0, and 2.5 mg/mL concentrated Ag NW dispersions.

Thin Film Fabrication and Characterization.

Glass slides and Si wafers (with a 280 nm thick oxide layer) were used as substrates and were first cleaned with piranha solution (concentrated $H_2SO_4$ and 30% $H_2O_2$ solution mixed at a 3:1 volumetric ratio) at 120° C. for 25 min, carefully rinsed with DI water several times, then immediately used for film deposition. G-O, Ag NW, and G-O/Au NP films were obtained by spin coating (4000 rpm) of the corresponding dispersions. G-O/Ag NW and Au NP/Ag NW films were produced by two sequential spin coating processes, each time using a dispersion of the corresponding single components. G-O/Au NP/Ag NW films were deposited as schematically shown in FIG. 3A. All G-O-containing films were subsequently reduced through exposure to $N_2H_4$ (hydrazine monohydrate, 98%, Sigma Aldrich) vapor at 100° C. for 24 h. Scanning electron microscopy (SEM) (Hitachi S-5500 SEM equipped with STEM) and transmission electron microscopy (TEM) (JEOL 2010F TEM, and using Quantafoil copper TEM grids from Ted Pella Inc.) were used to characterize the structural properties of the nanostructures and thin films. Optical transmittance (T) of the films was measured using UV-vis-NIR spectroscopy (Cary 5000) and spectroscopic ellipsometry (J. A. Wollam M2000). The latter was used to measure the film thickness as well. To measure the sheet resistance (Rs) using the four-probe van der Pauw method, four gold electrodes were deposited on the film in a configuration that leaves squared film area with a size in the range of 1×1 cm².

Antibacterial Material Synthesis and Characterization.

The bacterial strain used was *Escherichia coli* B REL 606 (Gram-negative). Luria_Bertani (LB) broth used for growth contained (per liter of deionized water) 10 g of tryptone, 5 g of yeast extract, and 10 g of NaCl. This solution was autoclaved for 30 min prior to use. For both types of experiments, the *E. coli* were prepared as follows: a small amount of frozen *E. coli* was transferred from a −80° C. glycerol stock into 10 mL of LB media in a glass culture tube, followed by shaking at 120 rpm and 37° C. for 24 h (Innova 44 Incubator Shaker, New Brunswick Scientific). Following the 24 h incubation period, the tubes contained approximately $2\times10^9$ CFU (colony forming units) $mL^{-1}$ of *E. coli*. For the adhesion experiments (FIGS. 6A and 6B), two cultures of *E. coli* were prepared as above. Following the 24 h incubation period, all 10 mL of each bacterial culture was transferred in sterile conditions into a 50 mL conical tube. The Si substrates (with 280 nm $SiO_2$ oxide layer), with and without the hybrid films, were then put into separate conical tubes and incubated for another 24 h at 37° C. with no shaking (Precision Model 815 Incubator, Thermo Scientific). Overall, 18 samples (9 clean Si wafers and 9 Si wafer covered with the hybrid films) have been tested in three separate runs of the adhesion experiment. Typical SEM images of the samples after the adhesion experiments are shown in FIGS. 6A and 6B. For the viability experiments, the bacteria, following the 24 h incubation period, were transferred in sterile conditions into a glass bottle that was attached to a sprayer (Preval spray unit, Sigma-Aldrich). The bacteria were then sprayed onto glass slides (circle shape VWR micro-cover glass with a diameter of 18 mm), with and without the hybrid films (number of sprays: 2-3 times, until the surface was almost fully covered by liquid droplets). The glass slides were air-dried for 3 min then completely covered with a melted agar (0.8% w/v) LB solution that was allowed to solidify at room temperature before incubating overnight at 37° C. to allow viable cells to form colonies. Overall, 21 samples (11 clean glass slides and 10 glass slides covered with the hybrid films) have been tested in four separate runs of the viability experiment. The photographs shown in FIGS. 6C and 6D have been taken with rear white-light illumination on a colony counter (Galaxy 230 colony counter, Rocker).

With respect to a second application of the present invention directed to reduced graphene oxide/copper nanowire hybrid films as high-performance transparent electrodes, the following discussion is deemed appropriate.

The electrical and optical properties of metal nanowire (NW) films make them promising materials for transparent conductive film (TCF) applications. It has been demonstrated that Au NW, Ag NW and Cu NW films can have sheet resistances (Rs) comparable to or lower than commonly used indium tin oxide (ITO) films at the same optical transmittance (T). Metal NW films on plastic substrates can have better mechanical properties than ITO films for flexible electronics. However, metal NW films can have low oxidation-resistance, poor adhesion to the substrate, and low stability in harsh environments. NW films have electrically non-conductive open spaces while some applications require continuously conductive regions. One strategy to overcome the drawbacks of metal NW films involves the addition of components, such as metal nanoparticles, thin metal films, oxide nanostructures or conductive polymers. Typically, the added constituent can only address one of the weaknesses of NW films and adding multiple constituents may lead to processing and cost-related issues.

In this context, reduced graphene oxide (RG-O) offers versatile functional properties. It has been demonstrated that the addition of RG-O into metal NW films resulted in hybrid films with improved electrical conductivity as RG-O provides two-dimensional pathways for charge transfer between non-percolated metal NWs. It will now be shown that RG-O platelets deposited on top of Cu NW films simultaneously address multiple problems, acting as an oxidation-resistive layer; a conductive and continuous transparent film that fills in open spaces between NWs; and an additional material that protects the NWs from harsh environments.

Results and Discussion

Cu NWs (average length >20 Km, average diameter <60 nm, purchased from Nanoforge) were dispersed in a mixture of 97.0 vol % isopropyl alcohol (IPA) and 3.0 vol % hydrazine monohydrate ($N_2H_4 \cdot H_2O$), at a concentration of ~1.2 mg/mL. Spray coating of this dispersion onto a target substrate yields a thin film of randomly oriented Cu NWs with open spaces between them as shown in FIG. 7A. FIG. 7A is an SEM image of a network of Cu NWs on a $SiO_2/Si$ substrate in accordance with an embodiment of the present invention. RG-O films were fabricated by spin coating a dispersion of graphene oxide (GO) platelets, followed by chemical and thermal reduction processes (see Methods further below). The resulting RG-O films on the $SiO_2/Si$ substrate have a continuous and smooth surface morphology (shown by line profile 701), as shown by atomic force microscopy (AFM) in FIG. 7B in accordance with an embodiment of the present invention.

Figure 7C:
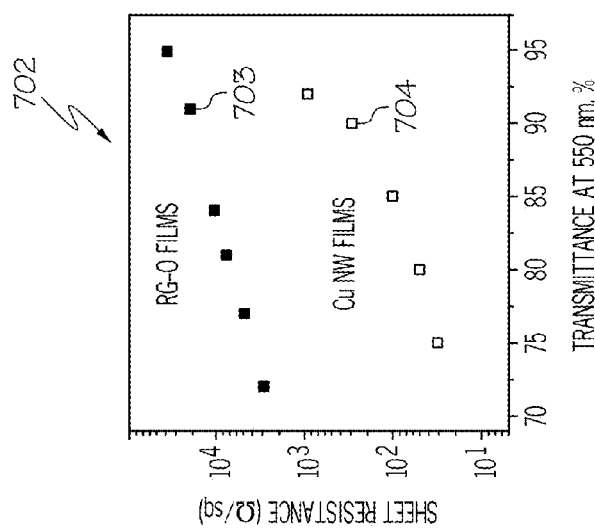
FIG. 7C is a graph of the optical transmittance and sheet resistance of spin coated RG-O films and spray coated Cu NW films in accordance with an embodiment of the present invention.
Figure 7A:
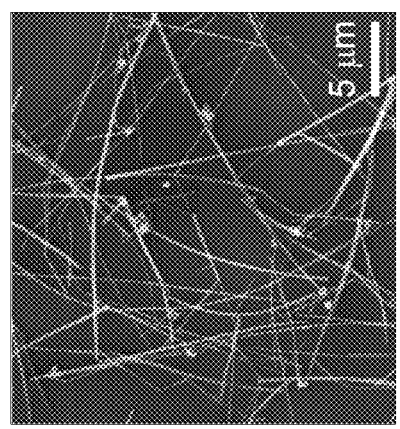
FIG. 7A is an SEM image of a network of Cu NWs on a $SiO_2$/Si substrate in accordance with an embodiment of the present invention.
Figure 7B:
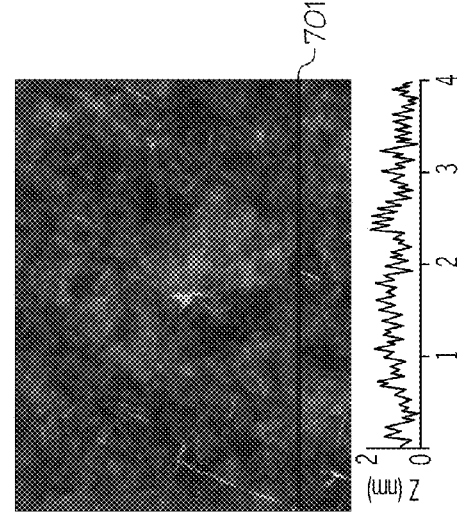
FIG. 7B is an atomic force microscopy (AFM) image of RG-O films on a $SiO_2$/Si substrate showing that the RG-O films have a continuous and smooth surface morphology in accordance with an embodiment of the present invention.

The sheet resistance and optical transmittance of the Cu NW and RG-O films are indicated in FIG. 7C, where FIG. 7C is a graph 702 of the optical transmittance and sheet resistance of spin coated RG-O films (indicator 703) and spray coated Cu NW films (indicator 704) in accordance with an embodiment of the present invention. To improve electrical conductivity the as-deposited Cu NW films were annealed in a tube furnace at 180° C. for 30 min under Ar (95%)+$H_2$ (5%) at 1 atm pressure. The Cu NW films with an optical transmittance at 550 nm of $T_{550}$>95% had no globally connected network of NWs (i.e., the films were non-conductive). Longer spraying time increases the density of NWs, yielding percolated networks, and decreases both the $T_{550}$ and Rs of the films. Typical films with $T_{550}$=90% have a sheet resistance of Rs=295+/19.5 $\Omega$/sq. Typical RG-O films with $T_{550}$=90% have a sheet resistance of Rs=19.6+/−2.7 k$\Omega$/sq. Contributing to the Rs of the RG-O films are structural defects and junction resistances between RG-O platelets.

Figure 8:
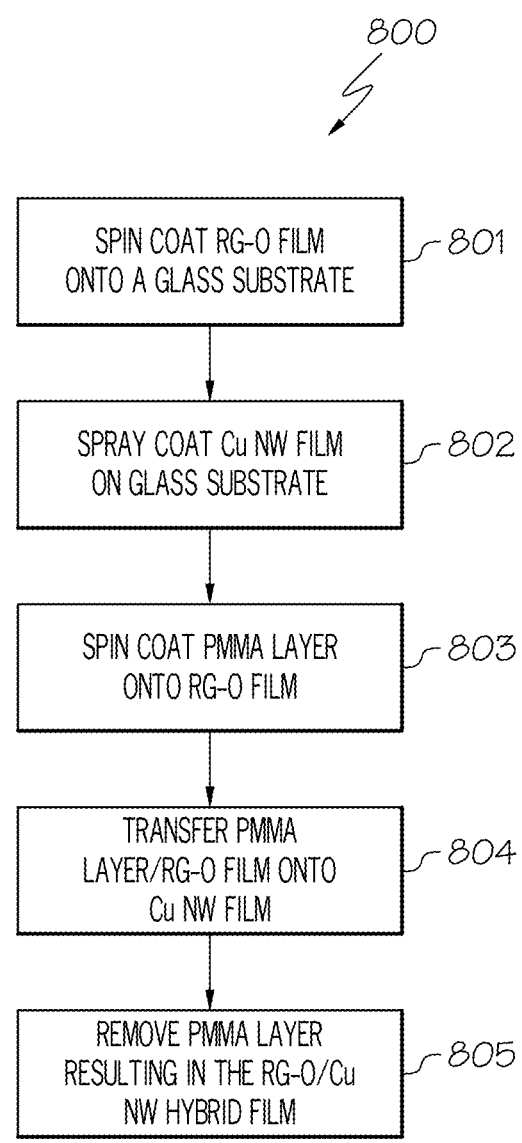
FIG. 8 is a flowchart of a method for assembling RG-O films onto Cu NW films in accordance with an embodiment of the present invention.

FIG. 8 is a flowchart of a method 800 for assembling RG-O films onto Cu NW films in accordance with an embodiment of the present invention. That is, FIG. 8 is a flowchart of a method 800 for the preparation of RG-O/Cu NW hybrid films in accordance with an embodiment of the present invention. FIG. 8 will be discussed in conjunction with FIGS. 9A-9D, which depict schematic views of the RG-O/Cu NW hybrid films formed using the steps described in method 800 of FIG. 8 in accordance with an embodiment of the present invention.

Figure 9A:
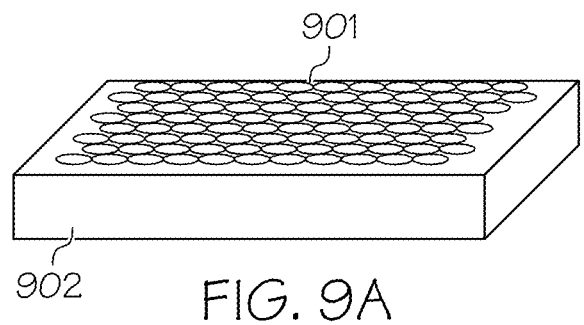
FIGS. 9A-9D depict schematic views of the RG-O/Cu NW hybrid films formed using the steps described in the method of FIG. 8 in accordance with an embodiment of the present invention.

Referring to FIG. 8, in conjunction with FIGS. 9A-9E, in step 801, an RG-O film 901 is spin coated onto a glass substrate 902 as illustrated in FIG. 9A.

Figure 9B:
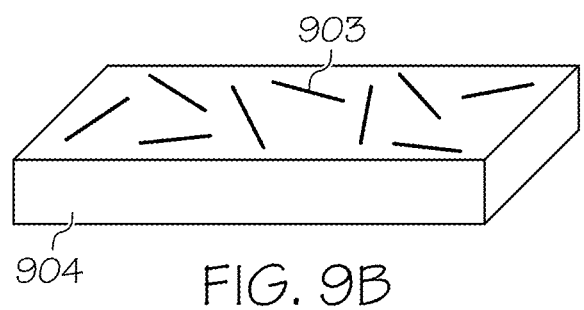

In step 802, Cu NW film 903 is spray coated on glass substrate 904 as shown in FIG. 9B.

In step 803, a Poly(methyl methacrylate) (PMMA) layer 905 is spin coated on top of RG-O film 901.

Figure 9C:
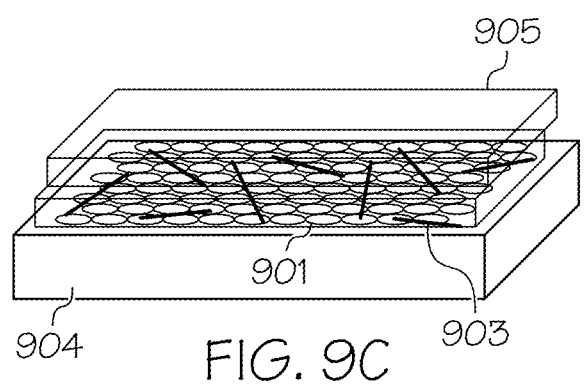

In step 804, PMMA layer 905/RG-O film 901 are transferred (dry transfer) onto Cu NW film 903 as illustrated in FIG. 9C.

Figure 9D:
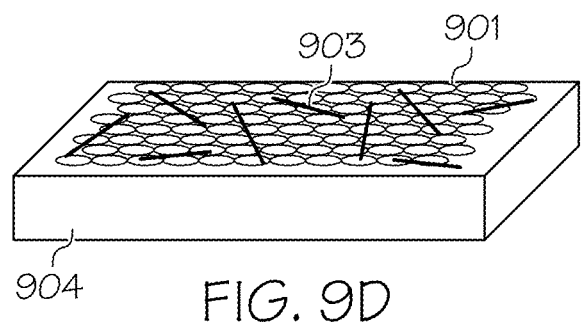

In step 805, the PMMA layer is removed resulting in the RG-O/Cu NW hybrid film as shown in FIG. 9D.

In some implementations, method 800 may include other and/or additional steps that, for clarity, are not depicted. Additionally, in some implementations, certain steps in method 800 may be omitted.

Figure 9E:
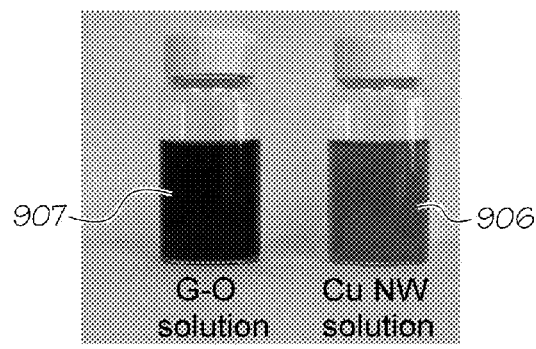
FIG. 9E is a photograph of G-O dispersed in water (1.0 mg/mL) and Cu NWs dispersed in IPA with 3.0 vol % $N_2H_4.H_2O$ (1.2 mg/mL) in accordance with an embodiment of the present invention.
Figure 9F:
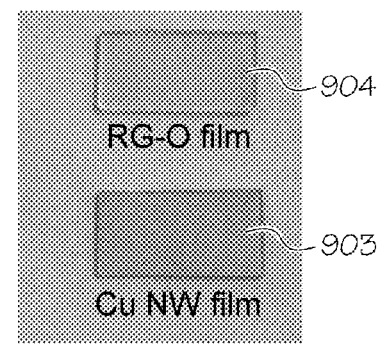
FIG. 9F is a photograph of RF—O (top) and Cu NW (bottom) films on glass substrates in accordance with an embodiment of the present invention.
Figure 9G:
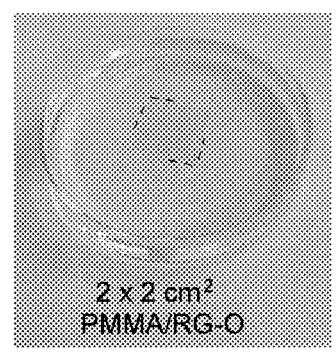
FIG. 9G is a photograph of the 2×2 $cm^2$ PMMA/RG-O film delaminated from glass substrate in 1M aqueous solution of NaOH in accordance with an embodiment of the present invention.
Figure 9H:
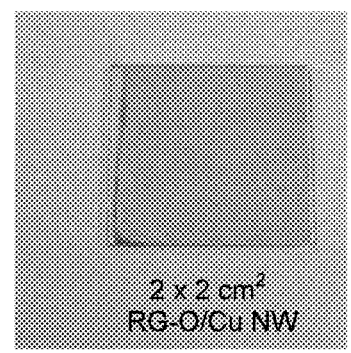
FIG. 9H is a photograph of the 2×2 $cm^2$ RG-O/Cu NW films on the glass substrate after the PMMA layer was removed in accordance with an embodiment of the present invention.

Further details regarding method 800 will now be discussed below. The dispersions of the Cu NWs (1.2 mg/mL) 906 and G-O (1.0 mg/mL) 907 shown in FIG. 9E were used to produce thin films (FIG. 9F) of Cu NWs 903 and RG-O 901 by spray and spin coating, respectively. FIG. 9E is a photograph of G-O dispersed in water (1.0 mg/mL) and Cu NWs dispersed in IPA with 3.0 vol % $N_2H_4 \cdot H_2O$ (1.2 mg/mL) in accordance with an embodiment of the present invention. FIG. 9F is a photograph of RF—O (top) and Cu NW (bottom) films (901, 903, respectively) on glass substrates (902, 904, respectively) in accordance with an embodiment of the present invention. As discussed above, a poly(methyl methacrylate) (PMMA) layer 905 was spin coated on top of the RG-O films 901, and the resulting PMMA/RG-O film was subsequently delaminated from the glass substrate 902 in 1M NaOH aqueous solution (FIG. 9G). FIG. 9G is a photograph of the 2×2 cm² PMMA/RG-O film delaminated from glass substrate 902 in 1M aqueous solution of NaOH in accordance with an embodiment of the present invention. The delaminated PMMA/RGO films were washed several times with de-ionized (DI) water in order to remove the residual NaOH, and then transferred on top of Cu NW films using a dry transfer method. After transfer, PMMA layer 905 was removed with acetone, resulting in the final RG-O/Cu NW hybrid films as shown in FIG. 9H. FIG.

9H is a photograph of the 2×2 cm² RG-O/Cu NW films on glass substrate 903 after PMMA layer 905 was removed in accordance with an embodiment of the present invention. To improve electrical conductivity, the obtained RG-O/Cu NW films were annealed in a tube furnace at 180° C. for 30 min under a Ar (95%)+H₂ (5%) gas mixture at 1 atm pressure.

Figure 10B:
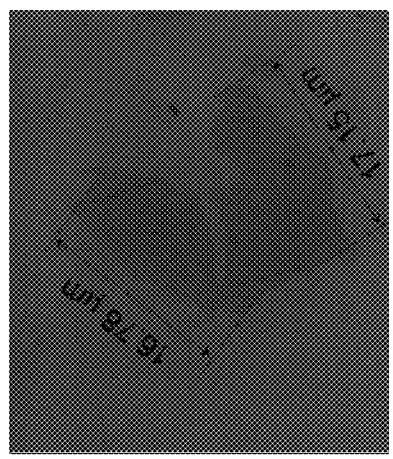
FIG. 10B is an SEM image of individual RG-O platelets in accordance with an embodiment of the present invention.
Figure 10C:
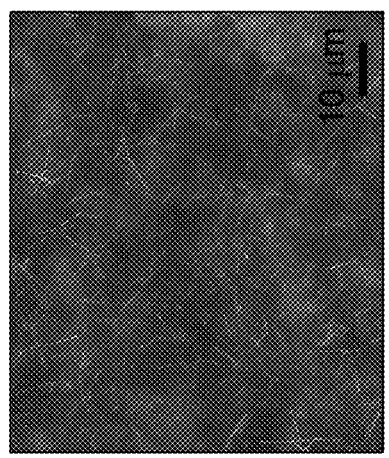
FIG. 10C is an SEM image of a typical RG-O/Cu NW film in accordance with an embodiment of the present invention.
Figure 10A:
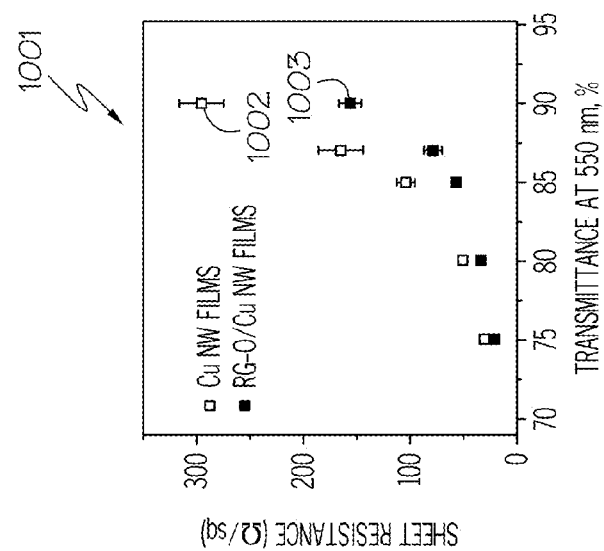
FIG. 10A is a graph showing the sheet resistances and optical transmittances of pure Cu NW films and RG-O/Cu NW hybrid films in accordance with an embodiment of the present invention.

FIG. 10A is a graph 1001 showing the sheet resistances and optical transmittances of pure Cu NW films (indicator 1002) and RG-O/Cu NW hybrid films (indicator 1003) in accordance with an embodiment of the present invention. The RG-O films used in the hybrid film fabrication had Rs=36.6+/−4.7 kΩ/sq and $T_{550}$=95.5%. The hybrid films had Rs=34+/−2.6 Ω/sq at $T_{550}$=80%, which can be compared to pure Cu NW films (Rs=51+/−4.0 Ω/sq) and pure RG-O films (Rs=7.6+/−0.86 kΩ/sq), each also at $T_{550}$=80%. Individual Cu NWs with an average length >20 Km can connect two or more RG-O platelets, and the metallic conductivity of these NWs can decrease or eliminate the platelet-platelet junction resistance. In turn, the film of overlapped and stacked RG-O platelets can bridge initially nonconnected Cu NWs. The lateral size of RG-O platelets may be as large as several micrometers, as shown in FIG. 10B, which is an SEM image of individual RG-O platelets with lateral sizes indicated in accordance with an embodiment of the present invention. A single RG-O platelet with such a lateral size can bridge two or more nonconnected Cu NWs separated by any distance smaller than the lateral size of the platelet. This may results in higher electrical conductivity of the hybrid films because of the absence of RG-O inter-platelet junction resistances. Without RG-O platelets, the non-connected Cu NWs cannot contribute to the electrical conductivity of the Cu NW films. The continuous RG-O film also eliminates the empty spaces between NWs, as shown in FIG. 10C, which is an SEM image of a typical RG-O/Cu NW film in accordance with an embodiment of the present invention, and provides a two dimensional conductive platform for charge carriers, which is particularly attractive for dyesensitized solar cells. Overall, the synergy between Cu NWs and RG-O platelets allow for the fabrication of the hybrid films with electrical conductivity better than pure RG-O and pure Cu NW films.

The RG-O film can also protect the Cu NWs underneath it from oxidation resulting in improved stability of the hybrid film. FIG. 11A is a graph 1101 showing the change of Rs over time of pure Cu NW and hybrid RG-O/Cu NW films in ambient atmosphere at room temperature (indicators 1102 and 1103, respectively) and at 60° C. (indicators 1104 and 1105, respectively) in accordance with an embodiment of the present invention. The room temperature Rs of Cu NW films increases from 57+/−2.5 Ω/sq (as-prepared sample) to 69+/−3.2 Ω/sq after 72 hours, and the Rs of the samples at 60° C. increases from 56+/−2.5 Ω/sq (as-prepared sample) to 94+/−4.7 Ω/sq also after 72 hours. The change in Rs values is due to the oxidation of the Cu NW films, and the more rapid increase at 60° C. is due to the faster kinetics of oxidation at higher temperatures. The Rs of the hybrid RG-O/Cu NW films show no significant change after 72 hours at room temperature and also at 60° C. This is consistent with Raman spectroscopy studies as illustrated in FIG. 11B, where FIG. 11B is a graph 1106 illustrating the Raman spectra of Cu NW films kept at room temperature (bottom) and 60° C. (middle) for 72 hours, and of RG-O/Cu NW films kept at 60° C. for 72 hours (top) in accordance with an embodiment of the present invention. Cu NW films, kept at room temperature for 72 hours, show Raman peaks at about 214, 460, and 644 cm⁻¹. The Raman spectrum of the Cu NW films kept at 60° C. for 72 hours exhibit the same peaks but with higher intensity, and several additional peaks in the range of 200-800 cm⁻¹. These Raman peaks are due to different copper oxides: CuO (299, 342, 500, 634 cm⁻¹), Cu₂O (214, 644 cm⁻¹), Cu(OH)₂ (450-470 cm⁻¹, 540-580 cm⁻¹). The higher intensity Raman peaks of the Cu NW films held at 60° C. for 72 hours, compared to the room temperature sample, along with the presence of CuO peaks, indicate a higher oxidation level (i.e., likely a thicker oxide layer) of the Cu NWs. In contrast, Raman spectra of RG-O/Cu NW hybrid films show only low-intensity peaks at around 214 cm⁻¹ and 644 cm⁻¹ due to the surface Cu2O layer formed during the film fabrication processes. The spectra of the hybrid films (72 hours at room temperature or at 60° C.) are similar to that of the pure Cu NW films directly after fabrication.

Figure 11C:
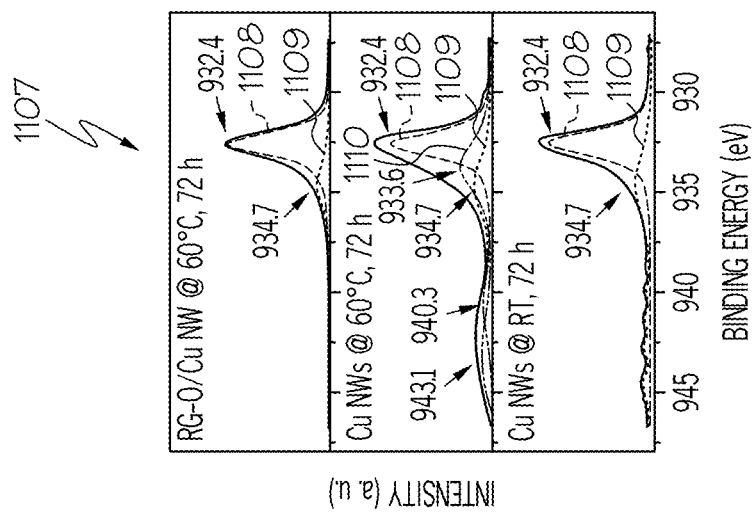
FIG. 11C is a graph illustrating Cu $2p_{3/2}$ XPS spectrum of Cu NW film kept at room temperature (bottom), and 60° C. (middle) for 72 hours, and of RG-O/Cu NW films kept at 60° C. for 72 hours (top) in accordance with an embodiment of the present invention.
Figure 11B:
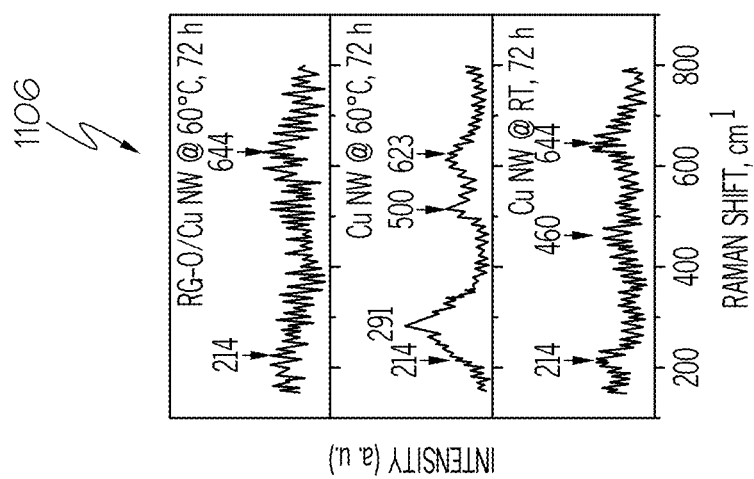
FIG. 11B is a graph illustrating the Raman spectra of Cu NW films kept at room temperature (bottom) and 60° C. (middle) for 72 hours, and of RG-O/Cu NW films kept at 60° C. for 72 hours (top) in accordance with an embodiment of the present invention.
Figure 11A:
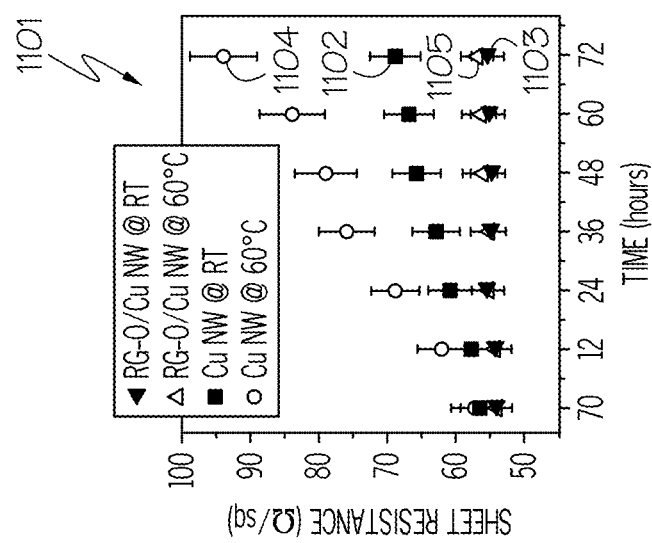
FIG. 11A is a graph showing the change of Rs over time of pure Cu NW and hybrid RG-O/Cu NW films in ambient atmosphere at room temperature and at 60° C. in accordance with an embodiment of the present invention.

X-ray photoelectron spectroscopy (XPS) studies of these films as shown in FIG. 11C at binding energies of Cu $2p_{3/2}$ (932.4 eV) were done to further evaluate the possible protection against oxidation by the RG-O film. FIG. 11C is a graph 1107 illustrating Cu $2p_{3/2}$ XPS spectrum of Cu NW film kept at room temperature (bottom), and 60° C. (middle) for 72 hours, and of RG-O/Cu NW films kept at 60° C. for 72 hours (top) in accordance with an embodiment of the present invention. The bottom spectrum in FIG. 11C was obtained from pure Cu NW films held at room temperature for 72 hours. The high intensity peak (dashed curve 1108) at ~932.4 eV is assigned to the spectral overlap of Cu $2p_{3/2}$ and Cu₂O, and the low intensity peak (dotted curve 1109) at ~934.7 eV is assigned to Cu(OH)₂. The spectrum obtained from the Cu NW film held at 60° C. for 72 hours shows a peak that can be deconvoluted into peaks that correspond to Cu(OH)₂ (934.7 eV) (dotted curve 1109), CuO (933.6 eV), and the shake-up satellites of CuO (940.3 eV and 943.1 eV) (solid curves 1110). The presence of different copper oxides in the latter spectrum indicates the higher level of oxidation of the Cu NW film held at 60° C. for 72 hours. These copper oxide compounds were not observed in the XPS spectra of RG-O/Cu NW films, which are similar to that of the as-prepared Cu NW films. These data show the high stability of the RG-O/Cu NWs films against oxidation, and that the RG-O layer protects the underlying Cu NWs from oxidation.

Recent reports show the improved electrical conductivity of hybrid films composed of Cu metal grids and Cu NWs assembled with graphene grown by chemical vapor deposition (CVD). In contrast, the results presented herein on RG-O/Cu NW hybrid films provide a solution-based route to fabricate both the single component and hybrid films. Additionally, compared to RG-O/Ag NW hybrid films, RG-O/Cu NW films are more cost-effective as Cu NWs are significantly less expensive than Ag NWs. In addition, the results presented herein on oxidation resistance of RG-O/Cu NW hybrid films are consistent with the recent studies on the protection of metal surfaces from oxidation with RG-O films and CVD-graphene grown onto metal substrates. Another approach to improve the oxidation resistance of Cu NW films is by coating Cu NWs with a Ni shell that yields oxidation-resistant cupronickel NWs. However, compared to RG-O, the Ni coating addresses only the oxidation of Cu NWs and lowers the aspect ratio of the Cu NWs, which can adversely affect the optical transmittance of the films.

The RG-O/Cu NW hybrid films were tested as a transparent electrode in Prussian blue (PB) based electrochromic (EC) devices. Typical PB-based EC devices are composed of a PB layer deposited onto an ITO transparent electrode. Electrochemical reactions, induced by an applied external electric field, cause reversible modulations in the optical properties of PB layers.

Color changes from blue to colorless upon reduction are caused by the conversion of a mixedvalence ($Fe^{2+}$, $Fe^{3+}$) compound into a single-valence (Fe2+) compound (and vice-versa upon oxidation) that can be described as:

(blue)$Fe^{3+}[Fe^{2+}(CN)_6]_3 + 4K^+ + 4e^- \Leftrightarrow$ (colorless) $K_4Fe_4^{2+}[Fe^{2+}(CN)_6]_3$ In one embodiment, ITO electrodes were replaced by RG-O/Cu NW electrodes on glass substrates. EC PB layers on top of the RG-O/Cu NW transparent electrodes have been electrochemically deposited using an aqueous solution of 0.05 M hydrochloric acid (HCl), 0.05 M potassium hexacyanoferrate (III) ($K_3[Fe(CN)_6]$), and 0.05 M iron(III) chloride ($FeCl_3$) in a 1:2:2 ratio. Applying an external field between the RG-O/Cu NW electrode and a Pt counter electrode, both immersed into the solution, results in the homogeneous deposition of PB layers onto the RG-O/Cu NW electrode.

Figure 12B:
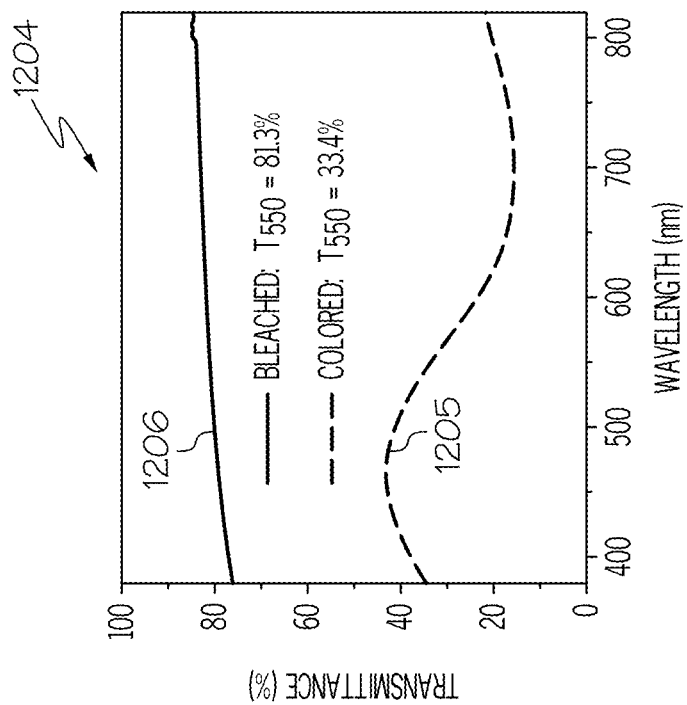
FIG. 12B is a graph illustrating the optical transmittance spectra of colored and bleached states of Prussian blue (PB) films deposited on a RG-O/Cu NW transparent electrode in accordance with an embodiment of the present invention.
Figure 12A:
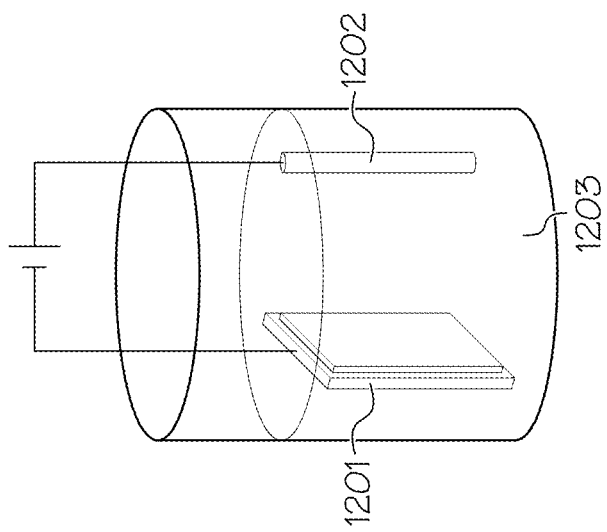
FIG. 12A is a schematic of an electrochromic device in an electrolyte solution in accordance with an embodiment of the present invention.

Optical property modulation of the deposited PB layers by the redox process has been tested using 1M KCl aqueous solution as an electrolyte as illustrated in FIG. 12A. FIG. 12A is a schematic of an electrochromic device (EC layer on RG-O/Cu NW/glass 1201 and Pt rod 1202) in an electrolyte solution (1M KCl 1203) in accordance with an embodiment of the present invention. Electrochemical reduction of PB induced by an external voltage (−0.6 V to the RG-O/Cu NW TCF) yields colorless EC layers. Application of a reverse external field induces an oxidation process, which generates mixed valence compounds and yields a blue color of the EC layers. The optical transmittance corresponding to the bleached ($T_{550}$=79.2%) and colored ($T_{550}$=36.4%) states of the PB are shown in FIG. 12B, where FIG. 12B is a graph 1204 illustrating the optical transmittance spectra of colored and bleached states of PB films (lines 1205 and 1206, respectively) deposited on a RG-O/Cu NW transparent electrode in accordance with an embodiment of the present invention. Typical coloration and bleaching times for 90% transmittance change are 75 s and 95 s, respectively. These values are close to that of an EC device using the same PB EC film and same electrolyte, but with an ITO electrode.

Such PB EC films with reversible coloration/bleaching properties cannot be obtained using pure Cu NW transparent electrodes; indeed, a mixed transparent electrode (a glass substrate with one-half covered by pure Cu NW film and the other by RG-O/Cu NW hybrid film, as shown in FIGS. 12C(1)-12C(3), as prepared film) was made that shows this. FIGS. 12C(1)-12C(3) illustrate the as-prepared mixed transparent electrode 1207 composed of pure Cu NW films 1208 and RG-O/Cu NW films 1209 with a silver (Ag) paste 1212 on top of electrode 1207 in accordance with an embodiment of the present invention. FIGS. 12C(1)-12C(3) further illustrate the initial (colored) state 1210 and bleached state (1211) of PB deposited on the mixed electrode. Homogeneous PB layers were deposited on top of the electrode (FIGS. 12C(1)-12C(3), colored state). In electrochemical bleaching processes, the PB layers on top of the RG-O/Cu NW film have been completely bleached, while no bleaching of the PB layer deposited on the pure Cu NW film was observed (FIGS. 12C(1)-12C(3), bleached state). This is because pure Cu NWs form copper hexacyanoferrate compounds during the deposition of PB layers. During the process of formation of these compounds, the Cu NW network(s) have been destroyed, and consequently, this electrode lost its high electrical conductivity. Also, Cu NWs films immersed into the electrolyte solution partially delaminate from the substrate, which also leads to the loss of NW network conductivity. In contrast, in RG-O/Cu NW films, the RG-O layer protects the Cu NWs from reacting with the harsh solution used for PB deposition, which allows for repeatable cycling and homogeneous optical modulation of the PB EC layer, and there was no delamination of the RG-O/Cu NW hybrid films when immersed in the KCl solution.

CONCLUSION

A film composed of RG-O platelets assembled onto a Cu NW film layer yields hybrid films with improved electrical conductivity, 2-D film continuity (no empty regions such as gaps between NWs), higher oxidation-resistance, and better adhesion to the substrate, than pure Cu NW films. EC device performance demonstrates that RG-O, acting as a protective layer for Cu NWs in harsh environments, makes these types of hybrid TCFs suitable for a wider range of applications than pure metal NW films.

Methods

Fabrication of Cu NW Films.

Cu NWs with a concentration of 1 mg/mL in aqueous solution containing 1% diethylhydroxylamine (DEHA) to prevent oxidation, and 1% polyvinylpyrrolidone (PVP) to prevent aggregation, were purchased from NanoForge. Cu NWs were separated from the solution by centrifugation (2000 rpm for 5 min). After removing the supernatant, the NW sediment was re-dispersed in isopropyl alcohol (IPA) mixed with 3.0 vol % hydrazine monohydrate ($N_2H_4.H_2O$) to prevent oxidation of Cu NWs, by vortexing for 3-4 min. This process was repeated four times in order to remove the PVP from the NW suspension. A 1.2 mg/mL dispersion of Cu NWs in IPA (having well-dispersed Cu NWs, FIG. 7A) was used for spray-coating. Higher (>1.2 mg/mL) concentrations of Cu NWs in the dispersion resulted in agglomerated NWs, and when spray coated these adversely affect Cu NW film optical properties. Repeated spray-coating yields the desired density of Cu NWs on the substrate. Between each sprayed pulse, complete drying of the sprayed droplets on the substrate was obtained. Keeping the substrate at about 60° C. and delicately blowing it with nitrogen gas accelerated the drying process.

Fabrication of RG-O Films.

Graphite oxide was produced from natural graphite (SP-1, Bay Carbon) using a modified Hummers method, as described elsewhere. Aqueous dispersions of G-O at various concentrations were prepared by stirring graphite oxide solids in pure water (18.0 MΩ·cm resistivity, purchased from Barnstead) for 3 hours, and then sonicating the resulting mixture (VWR B2500A-MT bath sonicator) for 45 minutes. The G-O dispersions were then spin-coated onto glass substrates using a spin speed of 4000 rpm for 2 min. The obtained GO films were subsequently reduced using hydrazine monohydrate ($N_2H_4.H_2O$) vapor for 24 hours, keeping the samples at 90° C., and were then thermally annealed at 400° C. for one hour in an Ar (95%)+H (5%) gas mixture at 1 atm pressure. RG-O films, obtained by spin coating of an aqueous G-O dispersion with a concentration of 1.0 mg/mL, possess Rs=36.6+/−4.7 kΩ/sq, $T_{550}$=95.5% and an average thickness of about 0.8 nm. The latter films were used to fabricate RG-O/Cu NW hybrid films.

Characterization of Films.

SEM (Hitachi S-5500 SEM equipped with STEM), and AFM (Park Systems Model XE-100 AFM) were used to characterize the structural properties of the nanostructures and thin films. Optical transmittances (T) were measured using ultravioletvisible-near infrared (UV-VIS NIR) spectroscopy (Cary 5000) and spectroscopic ellipsometry (J. A. Wollam M2000). Rs was measured with the four-probe van der Pauw method: four gold electrodes were deposited on the film in a square configuration with dimensions of ~6×6 mm². Raman spectroscopy (WITEC Alpha300, λ=488 nm, 100× objective) measurements were carried out to study the oxidation of Cu NWs. XPS experiments were performed on a Kratos Photoelectron Spectroscopy system equipped with an Al Kα monochromator X-ray source operating at a power of 350 W. Binding energies were determined relative to the metallic copper Cu $2p_{3/2}$ binding energy of 932.4 eV. Deconvolution of XPS spectra were obtained resolved by fitting each peak with a combined Guassian-Lorentzian function after background subtraction.

With respect to a third application of the present invention directed to improved electrical conductivity of graphene films integrated with metal nanowires, the following discussion is deemed appropriate.

Due to low electron-phonon scattering, graphene has excellent transport properties with theoretical values of charge carrier mobility higher than 200 000 $cm^2/V \cdot s^1$. In addition, single layer graphene absorbs about 2.3% of visible light. The combination of these unique properties makes graphene an excellent candidate for transparent conductive films (TCF). Chemical vapor deposition (CVD) of hydrocarbon gases on metal surfaces allows scaling graphene films to large sizes that can be transferred onto arbitrary substrates. These characteristics open the possibility to replace indium tin oxide (ITO) by graphene as the TCF, particularly for flexible and large-area device applications.

However, the sheet resistance (Rs) of CVD-grown monolayer graphene (>1 kΩ/sq) is significantly higher than ITO-based TCFs. The charge carrier mobility in these graphene films is much lower than mechanically exfoliated graphene as well as theoretically calculated values. Defects influence the transport properties of CVD-grown graphene. Large-area CVD-grown graphene is a polycrystalline material with topological defects, such as dislocations and grain boundaries. Grain boundaries in graphene are line defects at the interfaces between two domains with different crystallographic orientations. Depending on the detailed atomic structure, these defects can disrupt the sp2 delocalization of π electrons in graphene and effectively scatter the charge carriers. This potential formation of highly resistive grain boundaries may lead to the carriers being trapped periodically in domains. Nanoripples, another line feature in CVD grown films, can also scatter charge carriers by the out-of-plane flexural phonons confined within the defects. In addition to grain boundaries and nanoripples, a higher (than theoretical values) electrical resistivity of the graphene can arise from other defects, such as point defects, wrinkles, folds, tears and cracks, and so forth, that can scatter the charge carriers resulting in decreased ballistic transport path length and carrier mobility.

The electrical properties of graphene can be improved by minimizing the role of different defects. Some nonlinear structural defects in graphitic structures can be healed by high temperature processing. Growing a larger grain size graphene may result in some improvement in transport properties due to the lower density of grain boundaries. However, to date these approaches have not yielded large-area single layer graphene films with a sheet resistance <100 Ω/sq required for some device applications. Recently, some have theoretically predicted that elimination of the detrimental effect of line defects can be achieved through the integration of CVD-grown graphene with one-dimensional (1D) metal nanowires (NWs). It is demonstrated herein experimentally the assembly of monolayer graphene with 1D metal NWs with the goal of minimizing the influence of line defects and line disruptions (the latter describes the wrinkles, ripples, and folding) on the transport properties of graphene films. Graphene/metal NW hybrid films with TCF characteristics comparable to that of ITO films (typically, Rs=30-80 Ω/sq for an optical transmittance at λ=550 nm ($T_{550}$)=90%) were obtained and also tested as transparent electrodes in electrochromic devices to evaluate them possibly replacing the traditionally used ITO films.

Figure 13A:
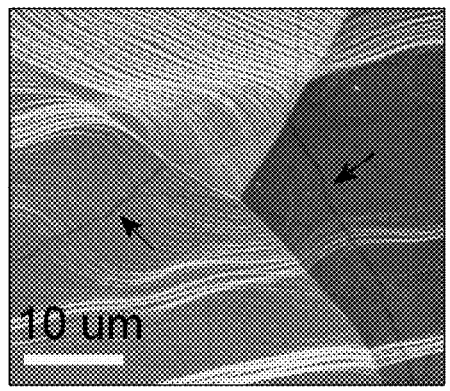
FIG. 13A is an SEM image of a graphene monolayer continuously grown across the grain boundaries and steps of a polycrystalline Cu substrate in accordance with an embodiment of the present invention.
Figure 13B:
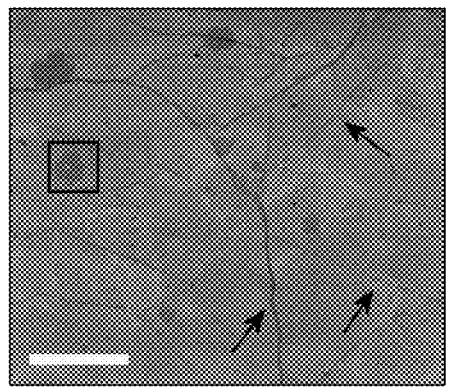
FIG. 13B is an SEM image of graphene transferred onto a $SiO_2$/Si substrate in accordance with an embodiment of the present invention.

Monolayer graphene was grown on polycrystalline Cu foil using a CVD technique described elsewhere. A scanning electron microscope (SEM) image of a typical single layer graphene that continuously spans steps and facets of the Cu substrate is shown in FIG. 13A. FIG. 13A is an SEM image of a graphene monolayer continuously grown across the grain boundaries and steps of a polycrystalline Cu substrate in accordance with an embodiment of the present invention. Line disruptions, such as wrinkles, formed due to the difference in thermal contraction between graphene and the Cu substrate upon cooling, can be easily seen in the SEM image. Transfer of graphene onto $SiO_2$/Si substrate substrates using a wet transfer method results in a higher density of line disruptions, as shown in FIG. 13B, indicating that the transfer process produces additional line disruptions in graphene films. FIG. 13B is an SEM image of graphene transferred onto a $SiO_2$/Si substrate in accordance with an embodiment of the present invention. As illustrated in FIG. 13B, the dark islands, one of which is shown in the "squared" area, are bilayer graphene.

Figure 13C:
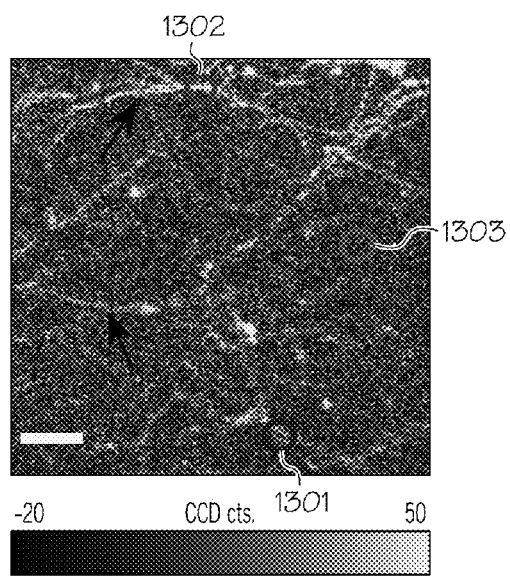
FIG. 13C is a Raman map (1300-1400 $cm^{-1}$) centered on the D mode (1365 $cm^{-1}$) in accordance with an embodiment of the present invention.
Figure 13D:
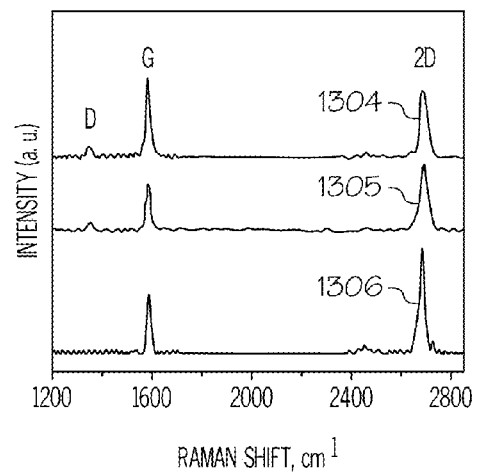
FIG. 13D illustrates the Raman spectra corresponding to the areas shown in the Raman map of FIG. 13C in accordance with an embodiment of the present invention.

The line disruptions in the transferred graphene were also observed by Raman spectroscopy (WITEC Alpha300, λ=532 nm, 100× objective). The Raman D band (~1365 $cm^{-1}$) of graphene is activated by the defects that cause an intervalley double resonance involving transitions near two inequivalent K points at neighboring corners of the first Brillouin zone of graphene. A Raman map (1300-1400 $cm^{-1}$) around the D mode of graphene on a $SiO_2$/Si substrate shows bright lines corresponding to the line disruptions as shown in FIG. 13C. FIG. 13C is a Raman map (1300-1400 $cm^{-1}$) centered on the D mode (1365 $cm^{-1}$) in accordance with an embodiment of the present invention. The arrows in FIGS. 13A-13C show the line disruptions, such as wrinkles, ripples and folding. The spectra obtained on the bright lines (circles 1301 and 1302 in FIG. 13C) show the presence of the D peak (blue and green spectra 1305, 1304, respectively, in FIG. 13D), in addition to the G and 2D modes centered at ~1575 $cm^{-1}$ and ~2680 $cm^{-1}$, respectively. FIG. 13D illustrates the Raman spectra corresponding to the areas shown in the Raman map of FIG. 13C in accordance with an embodiment of the present invention. The intensity ratio of G and 2D modes in these spectra are different (I(2D)/I(G) ≈1.4 for blue and 0.9 for green), indicating the diversity of line disruptions. No detectable D peak was observed in the spectrum taken on the areas without bright lines (circle 1303 in FIG. 13C corresponding to red spectrum 1306 in FIG. 13D). The latter spectrum is characterized by the intensity ratio of G and 2D modes (I(2D)/I(G)≈2) and the full width at half-maximum (fwhm) of the 2D band (≈27 $cm^{-1}$) associated with single layer graphene.

Figure 14:
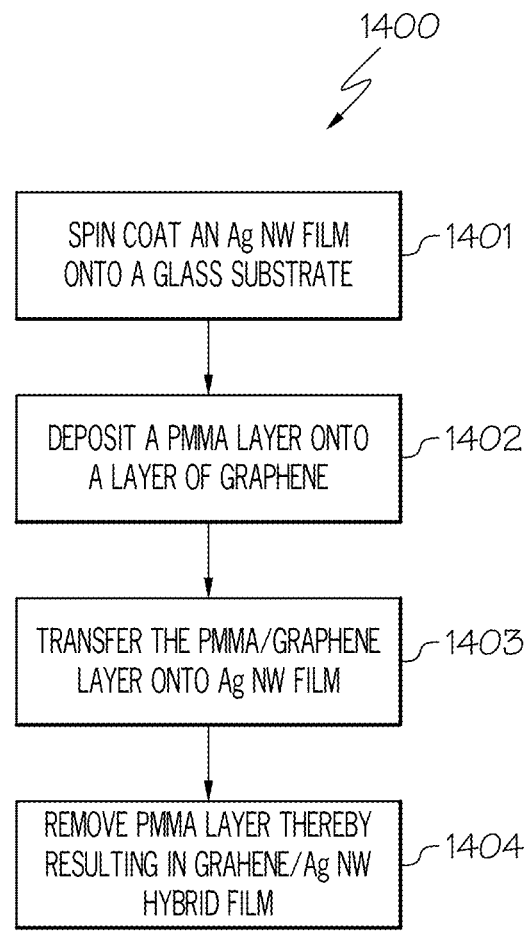
FIG. 14 is a flowchart of a method for fabricating graphene/Ag NW films in accordance with an embodiment of the present invention.

The sheet resistance of the graphene transferred onto glass substrates is as high as about 1.35±0.14 kΩ/sq but decreases to about 1.05±0.11 kΩ/sq after thermal treatment at 170° C. for 1 h in a vacuum chamber (p<2×10$^{-2}$ Torr). Integration of the graphene with Ag NWs Integration of the graphene with Ag NWs is discussed below in connection with FIGS. 14 and 15A-15G. FIG. 14 is a flowchart of a method 1400 for fabricating graphene/Ag NW films in accordance with an embodiment of the present invention. FIG. 14 will be discussed in conjunction with FIGS. 15A-15G, which depict schematic views of the graphene/Ag NW films formed using the steps described in method 1400 of FIG. 14 in accordance with an embodiment of the present invention.

Figure 15A:
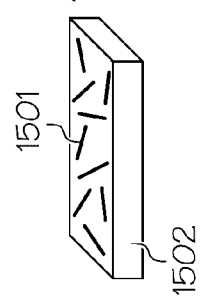
FIGS. 15A-15G depict schematic views of the graphene/Ag NW films formed using the steps described in the method of FIG. 14 in accordance with an embodiment of the present invention.

Referring to FIG. 14, in conjunction with FIGS. 15A-15G, in step 1401, an Ag NW film 1501 is spin coated onto a glass substrate 1502 as illustrated in FIG. 15A.

In step 1402, a PMMA layer 1503 is deposited onto a layer of graphene 1504.

Figure 15B:
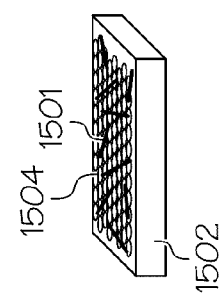

In step 1403, the PMMA/graphene layer is transferred (dry transferred) onto Ag NW film 1501 as illustrated in FIG. 15B.

Figure 15C:
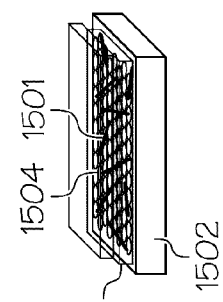

In step 1404, PMMA layer 1503 is removed thereby resulting in the graphene/Ag NW hybrid film as illustrated in FIG. 15C.

Figure 15D:
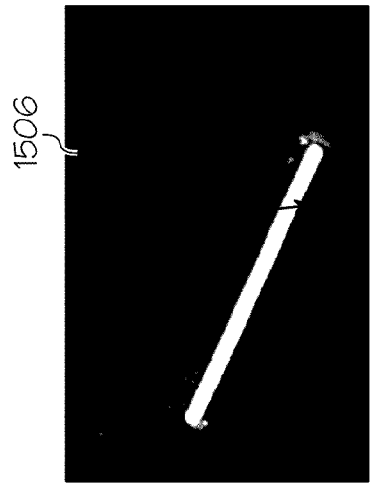
Figure 15E:
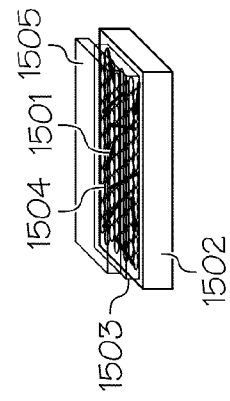
Figure 15F:
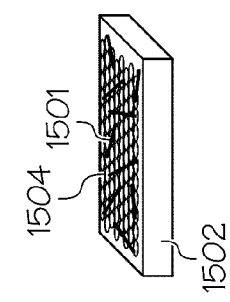
Figure 15G:
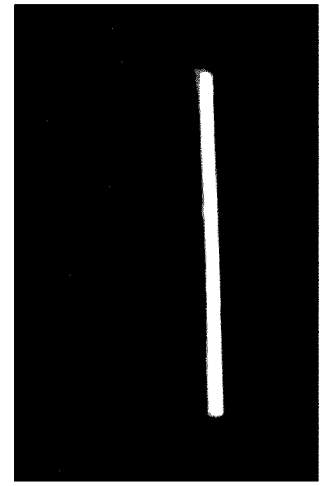

A modification to these steps involves modifying the dry transfer step whereby a small amount of poly(methyl methacrylate) (PMMA) solution 1505 was drop-coated on top of the precoated PMMA/graphene/Ag NW film as shown in FIG. 15E (denoted as "modified dry transfer"). The small amount of PMMA solution 1505 and PMMA layer 1503 may then be removed resulting in the graphene/Ag NW hybrid film as illustrated in FIG. 15F.

In some implementations, method 1400 may include other and/or additional steps that, for clarity, are not depicted. Additionally, in some implementations, certain steps in method 1400 may be omitted.

Further details regarding method 1400 will now be discussed below. Ag NW (average length and diameter of 5-25 μm and 100-130 nm, respectively) films on glass and SiO$_2$/Si substrates were obtained by spin coating NW dispersions in isopropyl alcohol with three different concentrations: 0.2 mg/mL, 0.6 mg/mL, and 1.0 mg/mL. The corresponding films were denoted as NW1, NW2, and NW3, respectively. The films possess high optical transparency ($T_{550}$ of about 98.6%, 97.2%, and 96.0%, respectively) that decreases with increasing NW concentration used to make the film. All of the NW films (NW1, NW2, and NW3) used in this work are nonconductive due to the subpercolation network of the NWs. Ag NW films above percolation may possess TCF characteristics comparable to ITO films. Here, the subpercolation regime was targeted, where NWs can individually and locally improve the conductivity of graphene platelets but not provide their own global conductive path(s). This excludes the electrical conductivity of pure Ag NW films in the hybrid systems and allows considering the contribution of individual NWs (no network of NWs) in altering the electrical conductivity of the hybrid films.

Transfer of graphene onto Ag NW films was first performed by a dry transfer technique (shown in FIG. 15B) that avoids trapping of the solutions (used in the transfer processes) near NWs. However, this transfer yielded graphene/Ag NW hybrid films in which most of the NWs were surrounded by suspended graphene 1506 as shown in FIG. 15D (scale bars are 1 μm) that can be easily torn during integration into devices that would result in worsened transport properties of the hybrid film. To avoid the formation of the suspended graphene, a small amount of poly(methyl methacrylate) (PMMA) solution 1505 was drop-coated on top of the precoated PMMA/graphene/NW film (shown in FIG. 15E, denoted as "modified dry transfer"). This results in dissolving of the precoated PMMA and allows the PMMA/PMMA/graphene to better conform to the surface morphology of the underlying Ag NWs. After curing at room temperature for about 30 min, the PMMA was dissolved by acetone. In the obtained graphene/NW hybrid films no suspended graphene around the NWs has been observed as illustrated by the SEM image of FIG. 15G (scale bars are 1 μm). The graphene layer follows the curvature of the underlying NWs, providing larger interfacial contact area between graphene and NWs. This may enhance charge transfer between these two nanostructures thus improving the conductivity of the hybrid film.

Figure 16A:
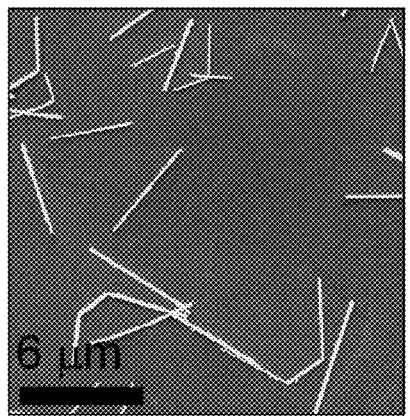
FIG. 16A is an SEM image of the hybrid films (graphene/NW films) produced by the modified dry transfer method, where the SEM image shows randomly oriented individual Ag NWs covered with a continuous 2D graphene layer in accordance with an embodiment of the present invention.
Figure 16B:
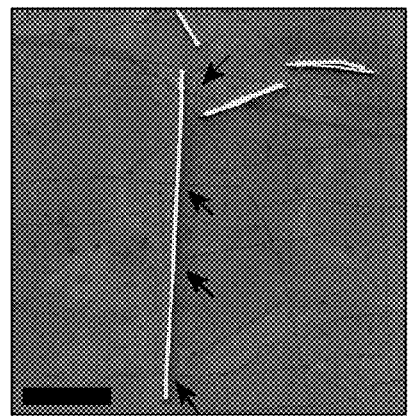
FIG. 16B is an SEM image depicting a NW crossing several line disruptions of the graphene layer as illustrated by the arrows in accordance with an embodiment of the present invention.
Figure 16C:
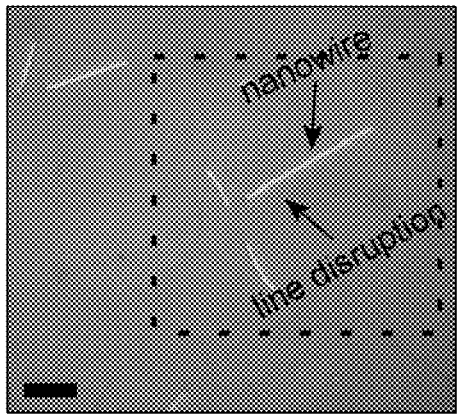
FIG. 16C is an optical microscopy image of the hybrid films with a dashed line corresponding to the Raman map (1560-1620 $cm^{-1}$) in accordance with an embodiment of the present invention.
Figure 16D:
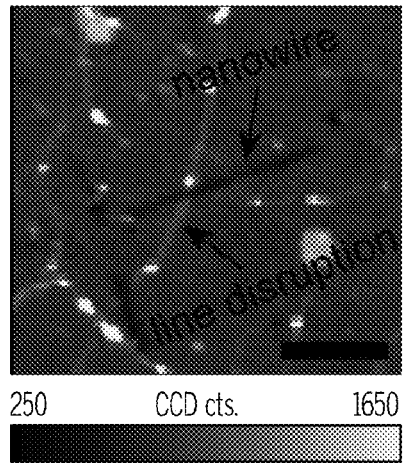
FIG. 16D shows a NW crossing with a line disruption in accordance with an embodiment of the present invention.

FIG. 16A is a typical SEM image of the hybrid films (graphene/NW films) produced by the modified dry transfer method discussed above, where the SEM image shows randomly oriented individual Ag NWs covered with a continuous 2D graphene layer in accordance with an embodiment of the present invention. FIG. 16B is an SEM image depicting a NW crossing several line disruptions of the graphene layer as illustrated by the arrows in accordance with an embodiment of the present invention. NW/line disruption crossings can also be seen in the Raman map (FIG. 16D, corresponding to the dashed area in the optical microscopy image in FIG. 16C). FIG. 16C is an optical microscopy image of the hybrid films with a dashed line corresponding to the Raman map (1560-1620 cm$^{-1}$) showing a NW crossing with a line disruption in FIG. 16D in accordance with an embodiment of the present invention. Scale bars in FIGS. 16A-16D are 6 μm. A Raman map (1500-1620 cm$^{-1}$) around the G mode of graphene on the SiO$_2$/Si substrate shows bright lines that correspond to the line disruptions and dark lines corresponding to the NWs as illustrated in FIG. 16C. The latter shows a lower intensity of Raman signal of graphene on top of the NWs.

Figure 16E:
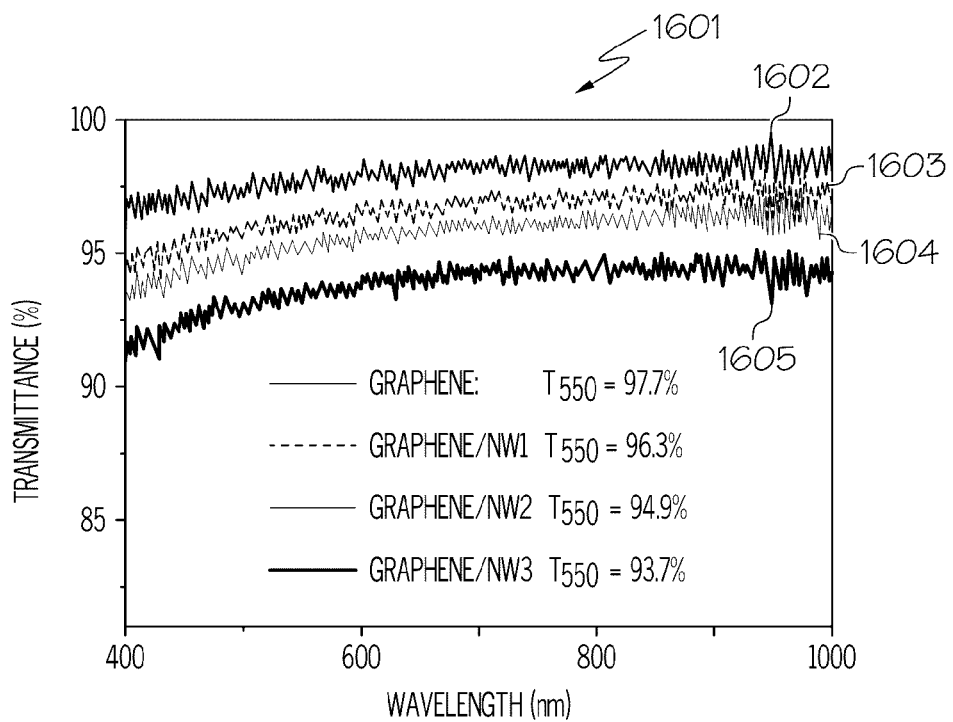
FIG. 16E is a graph of the optical transmittance spectra of graphene and graphene/NW films in accordance with an embodiment of the present invention.
Figure 16F:
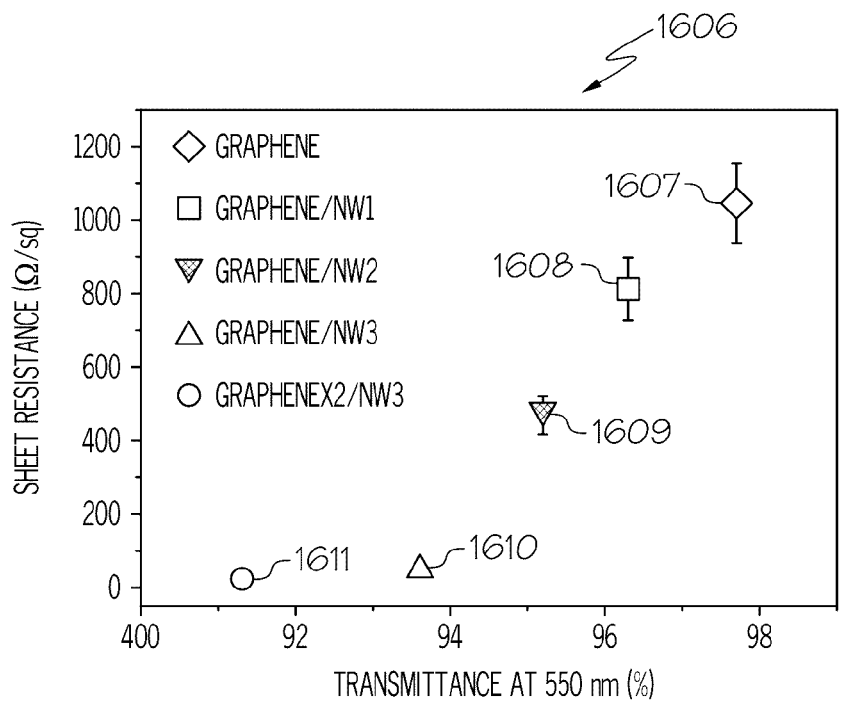
FIG. 16F is a graph showing that the Rs of the hybrid films decreases significantly with increasing concentration of Ag NWs for the films from NW1 to NW3 in accordance with an embodiment of the present invention.

The optical transmittance spectra of monolayer graphene and graphene/NW hybrid films presented in FIG. 16E show higher than 90% transparency for all the films, which satisfies requirements for optical properties of transparent electrodes. FIG. 16E is a graph 1601 of the optical transmittance spectra of graphene (line 1602) and graphene/NW films (lines 1603-1605) in accordance with an embodiment of the present invention. The sheet resistance Rs was measured using the van der Pauw method after annealing the films at 170° C. for 1 h in a vacuum chamber (p<2×10$^{-2}$ Torr). FIG. 16F is a graph 1606 showing that the Rs of the hybrid films (Rs for graphene is designated by indicator 1607; Rs for graphene/NW1 is designated by indicator 1608; Rs for graphene/NW2 is designated by indicator 1609; Rs for graphene/NW3 is designated by indicator 1610; Rs for graphene×2/NW3 is designated by indicator 1611) decreases significantly with increasing concentration of Ag NWs for the films from NW1 to NW3 in accordance with an embodiment of the present invention. The lowest Rs=64±6.1 Ω/sq with $T_{550}$=93.6% was obtained for the graphene/NW3 films, significantly lower than that of pure graphene (Rs=1.05±0.11 kΩ/sq). The obtained sheet resistance of the graphene/NW3 hybrid films is comparable to the intrinsic sheet resistance of "perfect" graphene (30 Ω/sq for graphene/SiO$_2$ system) that is due to solely electron-phonon scattering. Taking into account the nonpercolative concentration of Ag NWs in the hybrid system and the role of the line defects (such as grain boundaries) and line disruptions to the graphene sheet resistance, the low Rs values obtained demonstrate that the Ag NWs bridge line defects and line disruptions and thus strongly reduces the electrical resistance of graphene. Metal NWs crossing the line disruptions (FIG. 16B) and line defects thus provide new conductive pathways for charge carriers in polycrystalline monolayer graphene. The SEM and Raman map (FIGS. 16B and 16D) show the Ag NWs bridging line disruptions; however, some or many of the Ag NWs are also bridging the graphene line defects, as explained below. The length of Ag NWs reaches some tens of micrometers, and the average size of graphene grains is about 10-12 µm. Thus, many of the Ag NWs covered by monolayer graphene bridge the graphene grain boundaries, and therefore, the obtained low sheet resistance values are due to the bridging by Ag NWs of both line disruptions and grain boundaries present in these graphene films.

The conductivity of the obtained graphene/NW films can be further improved while maintaining the $T_{550}$>90%. For example, adding a second graphene layer onto the graphene/NW3 yields a film with Rs=24 (±3.6) Ω/sq for an optical transmittance of $T_{550}$≈91% (graphene×2/NW3 in FIG. 16F) that is better than doped four layer graphene-based (Rs=30 Ω/sq with $T_{550}$=90%) films and ITO-based (Rs=30-80 Ω/sq with $T_{550}$=90%) films. Alternatively, NW films above percolation are likely to yield graphene/NW films with conductivity exceeding the intrinsic limit of ideal graphene, as has been demonstrated for graphene/metal grid systems. These films are fundamentally different from that of the monolayer graphene/subpercolation NW films studied and described herein. Namely, the graphene film is the only conductive film component and the Ag NWs are an additional globally nonconductive component used to improve the conductivity of the graphene films. In contrast, in the hybrid systems with the percolated NW films or metal grids, the metal component films are the main conductive constituent, and graphene is used as an additional conductive component to enhance the conductivity of the metal-component structures.

Doping has been studied as an alternative route to improve the conductivity of graphene, as it can increase carrier densities, but doping does not directly address the adverse effects of line defects on conductivity. Doping of monolayer graphene films to achieve Rs<100 Ω/sq has not been achieved. Doped graphene films are often of limited stability, such as films that have about a 40% increase in graphene sheet resistance within a few days.

The graphene/NW films were tested as a transparent electrode in electrochromic (EC) devices. Typical EC devices are composed of an EC material and an electrolyte that are placed between two TCFs. During the electrochemical intercalation, induced by an external electric field applied between the two TCF electrodes, the injection and extraction of electrons and metal cations results in a modulation of optical properties of the EC layer. In the experiments of the present invention, one of the two ITO TCFs was replaced by the graphene/NW TCFs on glass substrates as shown in FIG. 17A. FIG. 17A is a schematic illustration of an EC device structure 1700 in accordance with an embodiment of the present invention. EC device structure 1700 includes a first layer of a glass substrate 1701, a graphene/NW film 1702 residing on top of glass substrate 1701, a thermal $WO_3$ film 1703 residing on top of graphene/NW film 1702, a sol-gel $WO_3$ film 1704 residing on top of thermal $WO_3$ film 1703, an electrolyte 1705 residing on the layer of sol-gel $WO_3$ film 1704, an ITO layer 1706 residing on electrolyte 1705, and a second layer of a glass substrate 1707 residing on ITO layer 1706. Tungsten trioxide ($WO_3$) films 1703, 1704 were used as the EC layer, and a propylene/ethylene carbonate solution (1:1) containing 1 M $LiClO_4$ (lithium perchlorate) was used as a Li conductive electrolyte 1705. It has been reported that sol-gel prepared nanostructured $WO_3$ films 1704 exhibit improved performance of EC devices with fast kinetics of the optical modulation. However, direct deposition of sol-gel prepared $WO_3$ 1704 onto graphene/NW TCFs yields inhomogeneous films with poor morphologies. Therefore, a buffer layer of EC $WO_3$ 1703 with a thickness of approximately 100 nm was deposited onto the graphene/NW hybrid TCFs 1702 by thermal evaporation of $WO_3$ powder. Sol-gel $WO_3$ film 1704 with more attractive morphology for intercalation was spin coated on top of the buffer layer 1703. The final double layer $WO_3$ thin films 1703, 1704 had a total thickness of about 500 nm. The complete EC device consisting of $WO_3$ EC layers 1703, 1704 and electrolyte 1705 placed between graphene/NW and ITO transparent electrodes 1702, 1706, respectively on glass substrates 1701, 1707 is schematically shown in FIG. 17A.

Electrochemical reduction of $WO_3$ induced by external voltage (−3.0 V to the graphene/NW TCF) is accompanied with injection of electrons and intercalation of $Li^+$ ions into the EC layers and generation of $W^{5+}$ sites. This results in an intense electrochromic absorption band due to the optically driven intervalence charge transfer between the $W^{6+}$ and $W^{5+}$ states and yields blue coloration of the EC films. The "coloration" reaction can be written as:

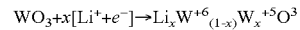

$$WO_3 + x[Li^+ + e^-] \rightarrow Li_x W^{+6}_{(1-x)} W_x^{+5} O^3$$

where x is the fractional number of sites in the $WO_3$ lattice that are filled by Li cations. The application of a reverse external field applied to the TCF electrodes extracts the Li cations and restores the bleached state of the EC film. The optical transmittance of the whole sandwich structure during coloration/bleaching cycles changes from $T_{550}$=77.2% (bleached state) to $T_{550}$=31.3% (colored state) as shown in FIG. 17B, where FIG. 17B is a graph 1708 depicting the optical transmittance spectra of bleached and colored states (lines 1709, 1710, respectively) of EC device 1700 of FIG. 17A in accordance with an embodiment of the present invention. Stable coloration/bleaching processes are achieved after several initial cycles. The coloration and bleaching time for 90% transmittance change are 115 s and 205 s, respectively. These values are close to that of a EC device using the same sol-gel EC film, same electrolyte, but with two ITO electrodes. The photograph images in FIGS. 17C(1)-17C(2) show homogeneously bleached and colored states 1711, 1712, respectively, of EC device 1700 of FIG. 17A with a background "graphene" 1713 in accordance with an embodiment of the present invention. Furthermore, FIGS. 17C(1)-17C(2) show the graphene/NW transparent electrode with a conductive silver paste 1714 on top of the electrode. Repeatable cycling and homogeneous optical modulation of the tested devices demonstrates the successful performance of the graphene/NW films as a transparent electrode in EC devices.

In summary, line defects and line disruptions in transferred CVD-grown polycrystalline graphene films degrade their transport properties. It was experimentally shown that graphene/NW assembly yields transparent conductive films with a sheet resistance (64 Ω/sq) slightly higher than the calculated intrinsic resistance of ideal graphene. The results demonstrate that the combination of graphene with 1D metal NWs can strongly reduce the overall resistance of the films. These hybrid films were successfully tested as a transparent electrode in electrochromic devices that show the coloration/bleaching characteristics comparable with EC devices using only ITO electrodes. The integration of such graphene/NW TCFs into EC devices demonstrates their potential for replacing ITO in a broad range of applications including displays, photovoltaics, and organic light-emitting diodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A hybrid transparent conductive film comprising:
    a film of silver nanowires; and
    a film of a reduced graphene oxide film and gold nanoparticles assembled in combination directly covering said film of silver nanowires.

2. The hybrid transparent conductive film as recited in claim 1, wherein said gold nanoparticles are located between said reduced graphene oxide film and said silver nanowires.

3. The hybrid transparent conductive film as recited in claim 1, wherein said gold nanoparticles are trapped on reduced graphene oxide platelets of said reduced graphene oxide film serving as a bridge between said silver nanowires.

4. The hybrid transparent conductive film as recited in claim 1, wherein reduced graphene oxide platelets of said reduced graphene oxide film cover approximately half of a surface of a silver nanowire by following its curvature.

5. The hybrid transparent conductive film as recited in claim 1, wherein said film of said combination of said reduced graphene oxide film and gold nanoparticles cover all said silver nanowires and open spaces between said silver nanowires.

6. The hybrid transparent conductive film as recited in claim 1, wherein said silver nanowires are randomly oriented.

7. The hybrid transparent conductive film as recited in claim 1, wherein said reduced graphene oxide film comprises antibacterial reduced graphene oxide platelets.

8. The hybrid transparent conductive film as recited in claim 1, wherein said reduced graphene oxide film is in direct contact with bacteria.

9. The hybrid transparent conductive film as recited in claim 8, wherein charge transfer processes between said bacteria and said reduced graphene oxide film is tuned by applying an electrical and/or optical field.

10. The hybrid transparent conductive film as recited in claim 1, wherein said graphene oxide film was reduced through exposure to hydrazine vapor.

* * * * *